(12) United States Patent
Xu et al.

(10) Patent No.: US 12,543,234 B2
(45) Date of Patent: Feb. 3, 2026

(54) METHOD FOR ESTABLISHING MULTI-LINK ASSOCIATION, AND DEVICE

(71) Applicant: GUANGDONG OPPO MOBILE TELECOMMUNICATIONS CORP., LTD., Dongguan (CN)

(72) Inventors: Yanchao Xu, Dongguan (CN); Ching-Hwa Yu, Dongguan (CN); Long Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 19/233,861

(22) Filed: Jun. 10, 2025

(65) Prior Publication Data
US 2025/0311038 A1 Oct. 2, 2025

Related U.S. Application Data

(63) Continuation of application No. 18/647,217, filed on Apr. 26, 2024, which is a continuation of application No. PCT/CN2021/126848, filed on Oct. 27, 2021.

(51) Int. Cl.
*H04W 76/15* (2018.01)
*H04L 61/50* (2022.01)
*H04L 101/622* (2022.01)

(52) U.S. Cl.
CPC ............ *H04W 76/15* (2018.02); *H04L 61/50* (2022.05); *H04L 2101/622* (2022.05)

(58) Field of Classification Search
CPC ... H04W 76/15; H04L 61/50; H04L 2101/622
See application file for complete search history.

(56) References Cited

U.S. PATENT DOCUMENTS

| | | | |
|---|---|---|---|
| 2021/0076437 A1* | 3/2021 | Kneckt | H04W 12/04 |
| 2021/0314846 A1* | 10/2021 | Chu | H04W 40/244 |
| 2023/0050803 A1* | 2/2023 | Gan | H04W 76/15 |

(Continued)

FOREIGN PATENT DOCUMENTS

| | | |
|---|---|---|
| CA | 3177223 A1 | 9/2021 |
| CN | 111741459 A | 10/2020 |

(Continued)

OTHER PUBLICATIONS

International search report of PCT application No. PCT/CN2021/126848 issued on Jul. 18, 2022.

(Continued)

*Primary Examiner* — Will W Lin
(74) *Attorney, Agent, or Firm* — BAYES PLLC

(57) ABSTRACT

Provided is a method for establishing a multi-link association. The method is applicable to an access point (AP) multi-link device (MLD), and the method comprises: receiving an association request frame from at least one station (STA) MLD, wherein the association request frame comprises a group of link medium access control (MAC) addresses, the group of link MAC addresses comprising a link MAC address of a link with which the STA MLD requests to establish an association; and transmitting an association response frame to the at least one STA MLD based on the link MAC address in the association request frame.

18 Claims, 15 Drawing Sheets

(56) References Cited

U.S. PATENT DOCUMENTS

| | | | |
|---|---|---|---|
| 2023/0117918 A1* | 4/2023 | Jang | H04W 76/11 370/329 |
| 2023/0156840 A1* | 5/2023 | Chitrakar | H04W 76/15 370/329 |
| 2023/0232315 A1* | 7/2023 | Chitrakar | H04W 48/12 370/329 |
| 2023/0284303 A1* | 9/2023 | Ko | H04W 48/12 370/310 |
| 2023/0389101 A1* | 11/2023 | Hong | H04W 48/16 |
| 2024/0064833 A1* | 2/2024 | Jang | H04L 69/14 |
| 2024/0089891 A1* | 3/2024 | Kneckt | H04W 48/14 |
| 2024/0214920 A1* | 6/2024 | Sevin | H04W 84/12 |

FOREIGN PATENT DOCUMENTS

| | | |
|---|---|---|
| JP | 2012531817 A | 12/2012 |
| WO | 2021178503 A1 | 9/2021 |

OTHER PUBLICATIONS

IEEE P802.11be™/D1.1, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), Prepared by the 802.11 Working Group of the LAN/MAN Standards Committee of the IEEE Computer Society, Jul. 23, 2021, Sections 9.4.2.295b.2, 11.3.6.3, 35.3.5.1.

IEEE Computer Society, IEEE Std 802.11™-2020, IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Apr. 2021, Section 11.3.5.3.

Extended European search report of counterpart European application No. 21961779.2 issued on Nov. 18, 2024.

Notice of Reasons for Refusal of Japanese application No. 2024-524660 issued on Jun. 24, 2025.

Non-final office Action of U.S. Appl. No. 18/647,217 issued on Oct. 1, 2025.

* cited by examiner

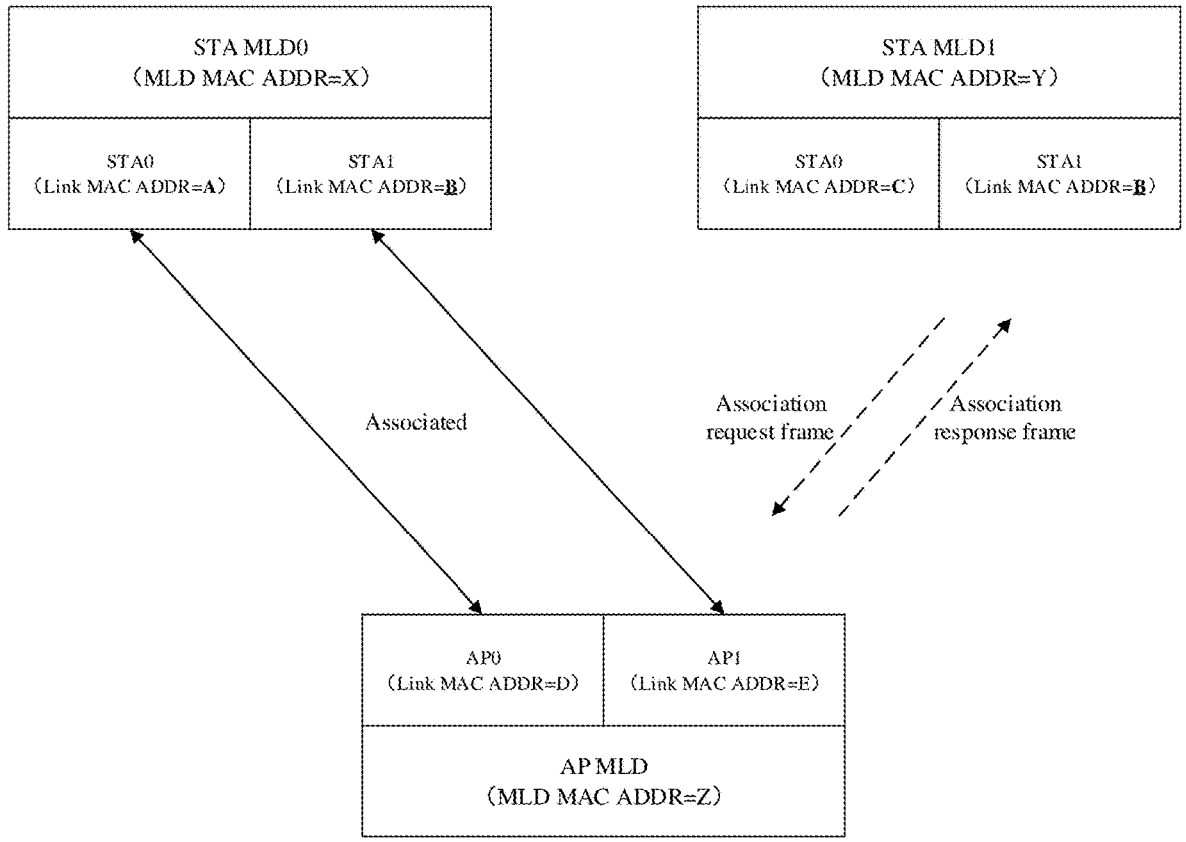

FIG. 8

| Receiving an association request frame from at least one STA MLD, wherein the association request frame includes a group of link MAC addresses, and the group of link MAC addresses include a link MAC address of a link with which the STA MLD requests to establish an association | 901 |

| Tansmitting an association response frame to the at least one STA MLD based on the link MAC address in the association request frame | 902 |

FIG. 9

METHOD FOR ESTABLISHING MULTI-LINK ASSOCIATION, AND DEVICE

CROSS-REFERENCE TO RELATED APPLICATIONS

This application is a continuation of U.S. patent application Ser. No. 18/647,217 filed on Apr. 26, 2024, which is a continuation of International Application No. PCT/CN2021/126848, filed on Oct. 27, 2021, both of which are incorporated herein by reference in their entireties.

TECHNICAL FIELD

Embodiments of the present disclosure relate to the technical field of communications, and in particular, to a method and apparatus for establishing a multi-link association, and a device and a medium thereof.

BACKGROUND

In Institute of Electrical and Electronics Engineers (IEEE) 802.11be, a function of supporting multiple links is defined. Based on definitions of two ends of communication in the IEEE 802.11, multiple links are set up between a station (STA) multi-link device (MLD) and an access point (AP) MLD. Based on advantages of the links, the STA MLD and the AP MLD are capable of transmitting and receiving data on the links, thereby achieving a high throughput, a low latency, and other advantages.

SUMMARY

Embodiments of the present disclosure provide a method and an apparatus for establishing a multi-link association, a device, and a medium, which address the problem that an AP MLD is unable to distinguish link MAC addresses. The technical solutions are as follows:

According to some embodiments of the embodiments of the present disclosure, a method for establishing a multi-link association is provided, wherein the method is applicable to an AP MLD. The method includes:

receiving an association request frame from at least one STA MLD, wherein the association request frame includes a group of link MAC addresses, wherein the group of link MAC addresses include a link MAC address of a link with which the STA MLD requests to establish an association; and transmitting an association response frame to the at least one STA MLD based on the link MAC address in the association request frame.

According to some embodiments of the embodiments of the present disclosure, a method for establishing a multi-link association is provided, wherein the method is applicable to a first STA MLD. The method includes:

transmitting an association request frame to an AP MLD, wherein the association request frame includes a first group of link MAC addresses, wherein the first group of link MAC addresses include a link MAC address of a link with which the first STA MLD requests to establish an association; and receiving an association response frame from the AP MLD, wherein the association response frame is transmitted based on the first group of link MAC addresses.

According to some embodiments of the embodiments of the present disclosure, an apparatus for establishing a multi-link association is provided. The apparatus includes:

a first receiver module configured to receive an association request frame from at least one STA MLD, wherein the association request frame includes a group of link MAC addresses, wherein the group of link MAC addresses include a link MAC address of a link with which the STA MLD requests to establish an association; and a first transmitter module configured to transmit an association response frame to the at least one STA MLD based on the link MAC address in the association request frame.

According to some embodiments of the embodiments of the present disclosure, an apparatus for establishing a multi-link association is provided. The apparatus includes:

a second transmitter module configured to transmit an association request frame to an AP MLD, wherein the association request frame includes a first group of link MAC addresses, wherein the first group of link MAC addresses include a link MAC address of a link with which a first STA MLD requests to establish an association; and a second receiver module configured to receive an association response frame from the AP MLD, wherein the association response frame is transmitted based on the first group of link MAC addresses.

According to some embodiments of the embodiments of the present disclosure, an MLD is provided. The MLD includes a processor and a transceiver connected to the processor.

The transceiver is configured to receive an association request frame from at least one STA MLD, wherein the association request frame includes a group of link MAC addresses, wherein the group of link MAC addresses include a link MAC address of a link with which the STA MLD requests to establish an association.

The transceiver is configured to transmit an association response frame to the at least one STA MLD based on the link MAC address in the association request frame.

According to some embodiments of the embodiments of the present disclosure, an MLD is provided. The MLD includes a processor and a transceiver connected to the processor.

The transceiver is configured to transmit an association request frame to an AP MLD, wherein the association request frame includes a first group of link MAC addresses, wherein the first group of link MAC addresses include a link MAC address of a link with which a first STA MLD requests to establish an association.

The transceiver is configured to receive an association response frame from the AP MLD, wherein the association response frame is transmitted based on the first group of link MAC addresses.

For example, the processor includes an application specific integrated circuit (ASIC).

According to some embodiments of the embodiments of the present disclosure, a non-transitory computer-readable storage medium is provided. The computer-readable storage medium stores a computer program. The computer program, when loaded and run by a processor, causes the processor to perform the method method for establishing a multi-link association as described above.

According to some embodiments of the embodiments of the present disclosure, a chip is provided. The chip includes programmable logic circuit and/or program instructions, wherein the chip is run to perform the method for establishing a multi-link association as described above.

According to some embodiments of the embodiments of the present disclosure, a computer program product or computer program is provided. The computer program product or the computer program includes computer instructions. The computer instructions are stored in a computer-readable storage medium, and when read from the computer-readable storage medium and executed by a processor, cause the processor to perform the method for establishing a multi-link association as described above.

BRIEF DESCRIPTION OF DRAWINGS

For clearer descriptions of the technical solutions in the embodiments of the present disclosure, the accompanying drawings required for describing the embodiments are briefly described below. Apparently, the accompanying drawings in the following description show merely some embodiments of the present disclosure, and those of ordinary skill in the art may still derive other accompanying drawings from these accompanying drawings without creative efforts.

FIG. 8 is a schematic diagram of a method for establishing a multi-link association according to some exemplary embodiments of the present disclosure;

FIG. 9 is a flowchart of a method for establishing a multi-link association according to some exemplary embodiments of the present disclosure;

DETAILED DESCRIPTION

For clearer descriptions of the objectives, technical solutions, and advantages of the present disclosure, exemplary embodiments of the present disclosure will be further described in detail with reference to the accompanying drawings.

A network architecture and a service scenario described in the embodiments of the present disclosure are only used to clearly describe the technical solutions in the embodiments of the present disclosure, and do not constitute a limitation on the technical solutions according to the embodiments of the present disclosure. A person of ordinary skill in the art may understand that, with evolution of the network architecture and emergence of a new service scenario, the technical solutions according to the embodiments of the present disclosure are also applicable to a similar technical problem.

The technical solutions according to the embodiments of the present disclosure are applicable to various communication systems, such as a WLAN, a wireless fidelity (Wi-Fi) system, or other communication systems.

Figure 1:
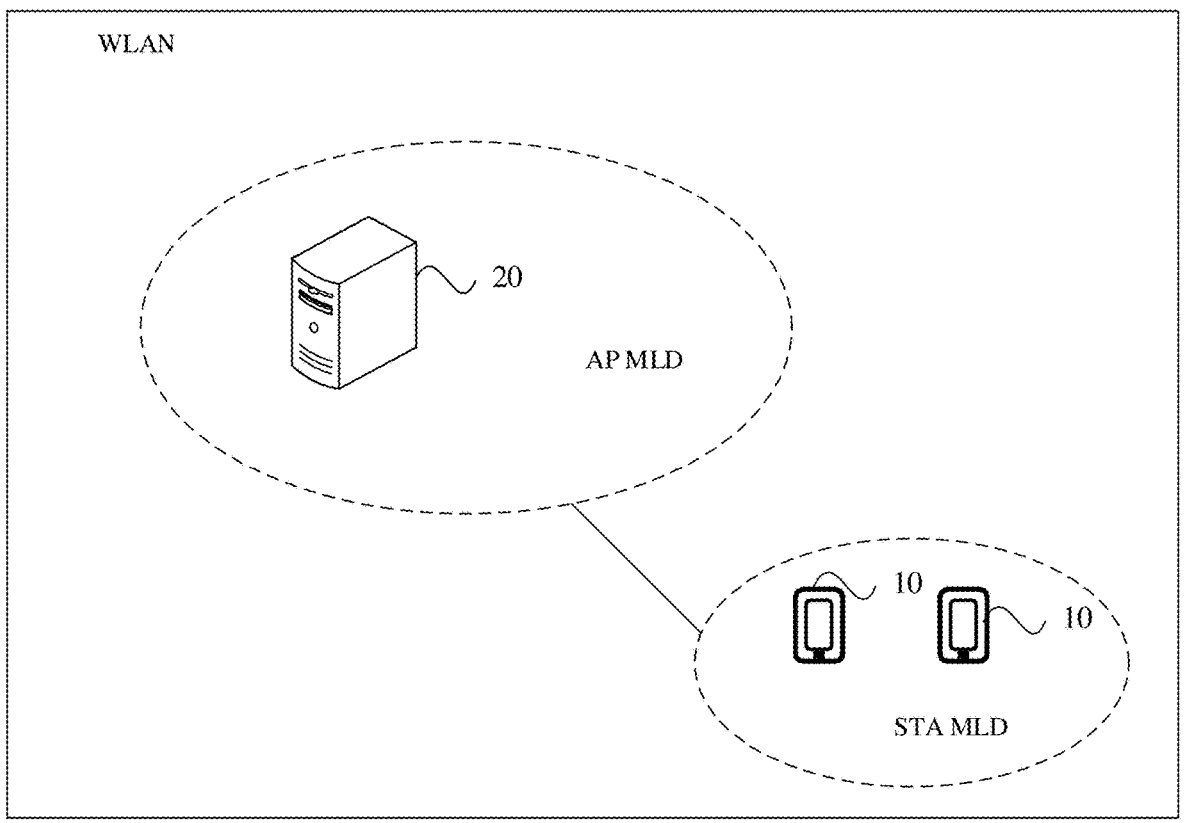
FIG. 1 is a schematic diagram of a wireless local area network (WLAN) according to some exemplary embodiments of the present disclosure.

FIG. 1 is a block diagram of a WLAN according to some exemplary embodiments of the present disclosure. The WLAN may include an STA MLD 10 and an AP MLD 20.

There are multiple links between the STA MLD 10 and the AP MLD 20.

The AP MLD 20 is a device deployed in the WLAN to provide a wireless communication function for the STA MLD 10. The STA MLD 10 may be a user equipment (UE), an access terminal, a subscriber unit, a subscriber station, a mobile station, a mobile platform, a remote station, a remote terminal, a mobile device, a wireless communication device, a user agent, or a user apparatus. Optionally, the STA MLD 10 may alternatively be a cellular phone, a cordless phone, a Session Initiation Protocol (SIP) phone, a wireless local loop (WLL) station, a personal digital assistant (PDA), a handheld device having the wireless communication function, a computing device or any other processing device connected to a wireless modem, a vehicle-mounted device, or a wearable device. This is not limited in the embodiments of the present disclosure.

In some scenarios, an AP is also referred to as an AP STA. In other words, the AP is also a type of STA in a sense.

In some scenarios, an STA is also referred to as a non-AP STA. Communication in a communication system may be communication between the AP and the non-AP STA, communication between non-AP STAs, or communication between the STA and a peer STA. The peer STA may be a device communicating with a peer end of the STA. For example, the peer STA may be the AP or the non-AP STA.

It should be understood that a role of the STA in the communication system is not absolute. In some scenarios, when a mobile phone is connected to a router, the mobile phone is the non-AP STA; and when a mobile phone serves as a hotspot for another mobile phone, the mobile phone acts as the AP.

In the embodiments of the present disclosure, both the STA MLD 10 and the AP MLD 20 support the IEEE 802.11 standard.

In some embodiments, the non-AP STA supports an 802.11be standard. The non-AP STA also supports a plurality of current and future WLAN standards of an 802.11 family, such as 802.11ax, 802.11ac, 802.11n, 802.11g, 802.11b, and 802.11a.

In some embodiments, the AP may be a device supporting the 802.11be standard. The AP may also be a device supporting the current and future WLAN standards of the 802.11 family, such as the 802.11ax, the 802.11ac, the 802.11n, the 802.11g, the 802.11b, and the 802.11a.

In the embodiments of the present disclosure, the STA may be a mobile phone, a pad, a computer, a virtual reality (VR) device, or an augmented reality (AR) device that supports a WLAN/Wi-Fi technology, a wireless device in industrial control, a set-top box, wireless device in self driving, an in-vehicle communication device, a wireless device in a remote medical system, a wireless device in a smart grid, a wireless device in transportation safety, a wireless device in a smart city or a smart home, a wireless communication chip/ASIC/SOC/, or the like.

The AP and the non-AP STA may be devices applied in the Internet of Vehicles (IoV), may be Internet of things (IoT) nodes and sensors in the IoT, may be smart cameras, smart remote controls, and smart water and electricity meters in the smart home, may be sensors in the smart city, or the like.

Before the technical solutions of the present disclosure are described, some technical knowledge involved in the present disclosure is first described.

In the IEEE 802.11be, a function for supporting multiple links of the IEEE 802.11 is defined. Based on definitions of two ends of communication in the IEEE 802.11, one end is an STA MLD and the other end is an AP MLD. In the case that multiple links are set up between the STA MLD and the AP MLD, the STA MLD and the AP MLD transmit and receive data on the links based on advantages of the links, thereby achieving a high throughput, a low latency, and other advantages.

Figure 2:
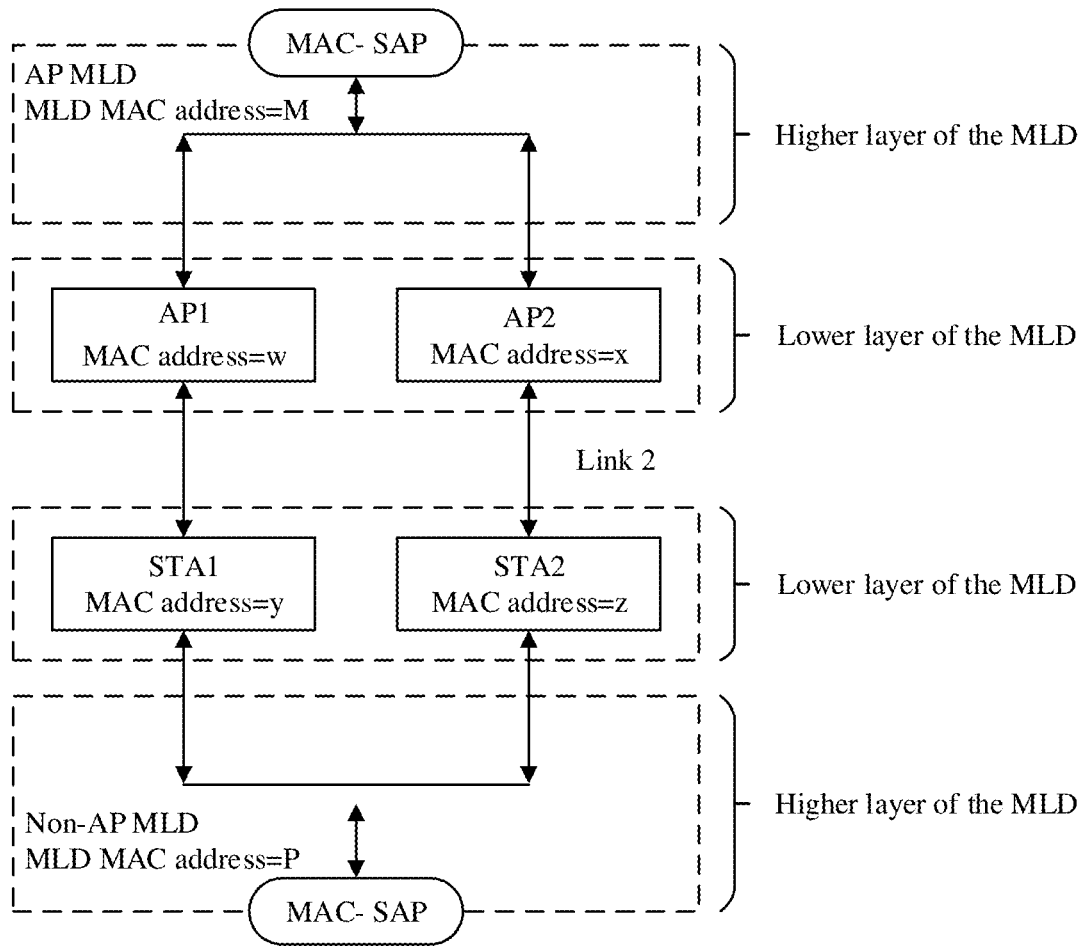
FIG. 2 is a schematic diagram of multiple links associated between an STA MLD and an AP MLD according to some exemplary embodiments of the present disclosure.

Each traditional single-link device that supports the IEEE 802.11 has a MAC address, which uniquely identifies the single-link device. An MLD defined in the IEEE 802.11be has multiple links, and each of the links has an independent MAC address. In addition, one MLD also has an MLD MAC address (or a device MAC address). FIG. 2 shows a reference model of the MLD defined in the IEEE 802.11be. As shown in FIG. 2, two links, namely a link 1 and a link 2, are available between two MLDs (STA MLD and AP MLD/non-AP MLD). In addition, there is an independent link MAC address (which is alternatively referred to as a WM MAC address) for each link in a lower MAC layer (layer lower than a MAC layer/lower layer) of each MLD. The AP MLD has a link MAC address of w for the link 1 and has a link MAC address of x for the link 2. The STA MLD has a link MAC address of y for the link 1 and has a link MAC address of z for the link 2. In addition, there is an MLD MAC address in an upper MAC layer (layer higher than the MAC layer/higher layer) of the MLD. An MLD MAC address (which is alternatively referred to as a "device MAC address") of the AP MLD is M, and a device MAC address of the STA MLD is P.

The MLD is divided into the lower MAC layer and the upper MAC layer because some functionalities in the MLD are independent for each link, which are referred to as link level functionalities, and some functionalities are uniformly shared by all links, which are referred to as MLD level functionalities. In this way, the link level functionality is identified by using the link MAC address, and the MLD level functionality is identified by using the MLD MAC address.

Figure 3:
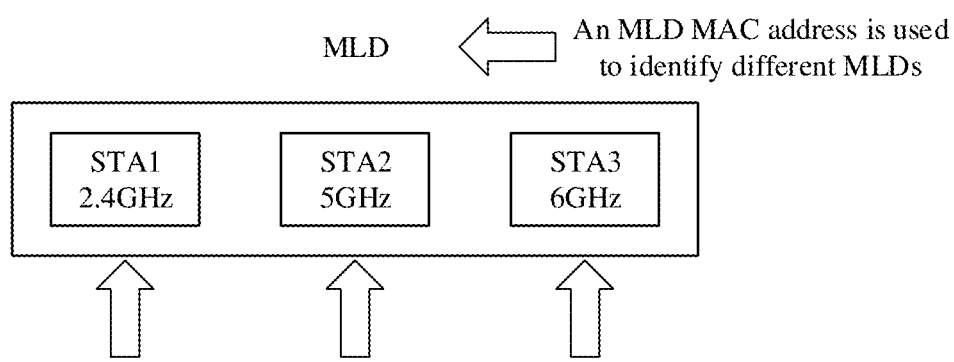
FIG. 3 is a schematic diagram of an STA MLD according to some exemplary embodiments of the present disclosure.

In the IEEE 802.11be, the MLD MAC address is used to identify different MLDs. However, in an 802.11 frame transmitted by the MLD on each link is identified by using a corresponding link/WM MAC address of the link. FIG. 3 shows an STA MLD with three links, namely an STA 1, an STA 2, and an STA 3. Each link has its own link/WM MAC address, and the entire STA MLD is identified by using a corresponding MLD MAC address.

Figure 4:
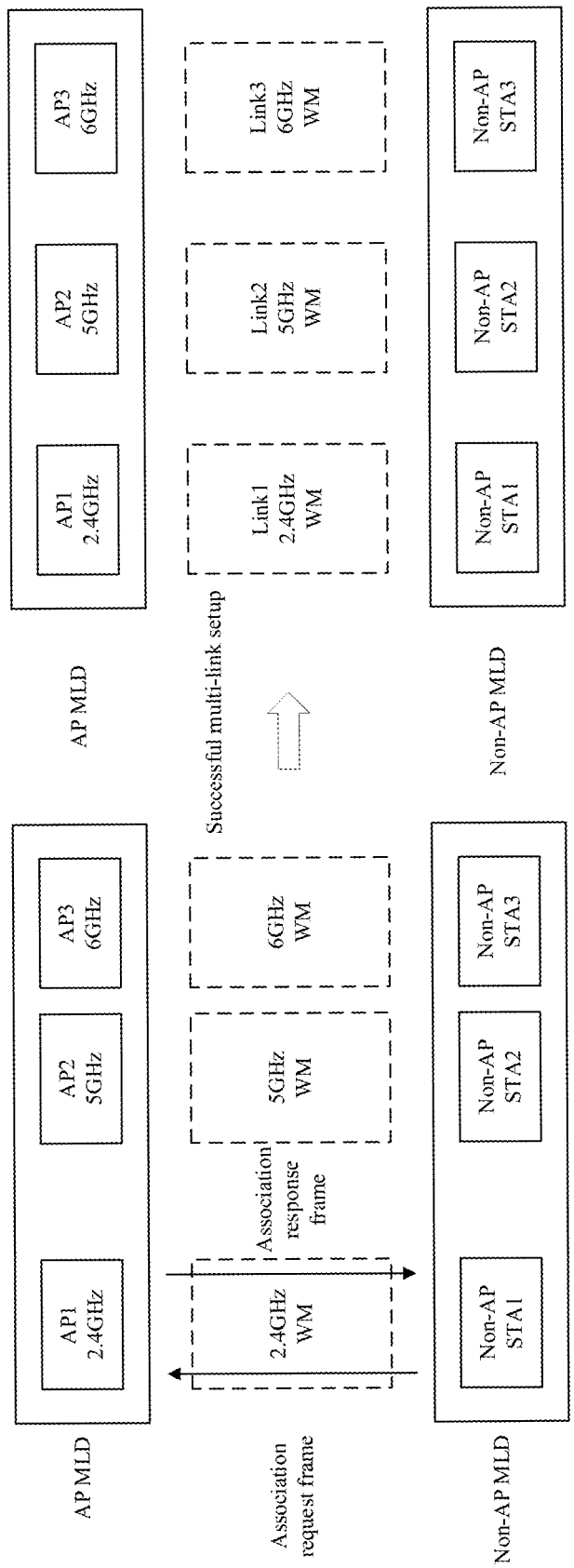
FIG. 4 is a schematic diagram of establishing a multi-link association between an STA MLD and an AP MLD according to some exemplary embodiments of the present disclosure.

In the IEEE 802.11be, in the process that the STA MLD and the AP MLD establish an association between multiple links, in other words, in the process that the STA MLD and the AP MLD perform multi-link setup, functionalities related to an association status between these two MLDs, such as authentication, association, and reassociation, are MLD level functionalities, and therefore are identified based on the MLD MAC address. In the process that the STA MLD and the AP MLD perform the multi-link setup, the STA MLD and the AP MLD are allowed to perform an association process only on any link, negotiate an association parameter of another link based on information exchanged in the association process on the any link, and establish an association with the another link. In some exemplary embodiments, as shown in FIG. 4, the STA MLD and the AP MLD perform a multi-link setup process on the link 1. The STA MLD first transmits an association request (association request frame). The association request frame carries the MLD MAC address of the STA MLD, a link through which the STA MLD wants to establish an association with the AP MLD, and a link/WM MAC address that is of the STA 1/2/3 and corresponds to the STA MLD on each link. After accepting the multi-link association request, the AP MLD returns an association response (association response frame) to the STA MLD, which carries the MLD MAC address of the AP MLD and a link/WM MAC address that is of an AP 1/2/3 and corresponds to the AP MLD on each link.

Figure 5:
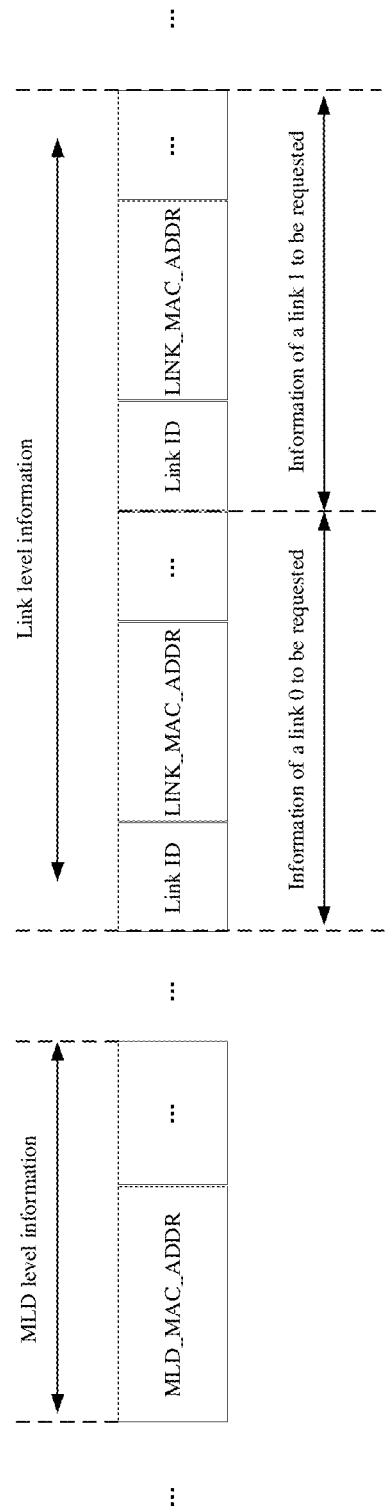
FIG. 5 is a schematic diagram of an association request frame according to some exemplary embodiments of the present disclosure.

FIG. 5 shows some information carried in the association request frame transmitted by the STA MLD. An MLD Level Information field carries the MLD MAC address of the STA MLD, and a Link Level Information field carries relevant information of each link with which the STA MLD is expected to establish an association, including a corresponding link ID of the link and a link MAC address that is of each link and corresponds to the STA MLD, wherein the address is abbreviated as "ADDR".

Figure 6:
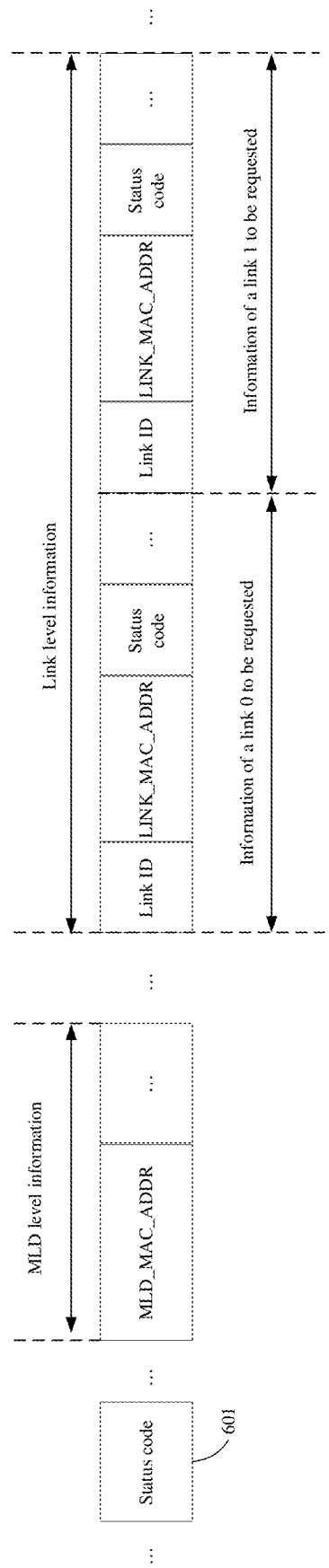
FIG. 6 is a schematic diagram of an association response frame according to some exemplary embodiments of the present disclosure.

FIG. 6 shows some information carried in the association response frame transmitted by the AP MLD. An MLD Level Information field carries the MLD MAC address of the AP MLD and a status code indicating whether the AP MLD accepts the multi-link association request, and a Link Level Information field carries relevant information of each link with which the STA MLD is expected to establish the association, including the corresponding link ID of the link, a link MAC address that is of each link and corresponds to the AP MLD, and a status code indicating whether the AP MLD accepts the corresponding association request on each link.

In the current IEEE 802.11be, the AP MLD maintains an association state based on an MLD MAC address of an STA MLD, but does not detect a link/WM MAC address of each corresponding link of the STA MLD. As a result, a following situation occurs: Two STA MLDs, namely an STA MLD 0 and an STA MLD 1, have different MLD MAC addresses, but a link of the STA MLD 0 and a link of the STA MLD 1 have a same link/WM MAC address.

Figure 7:
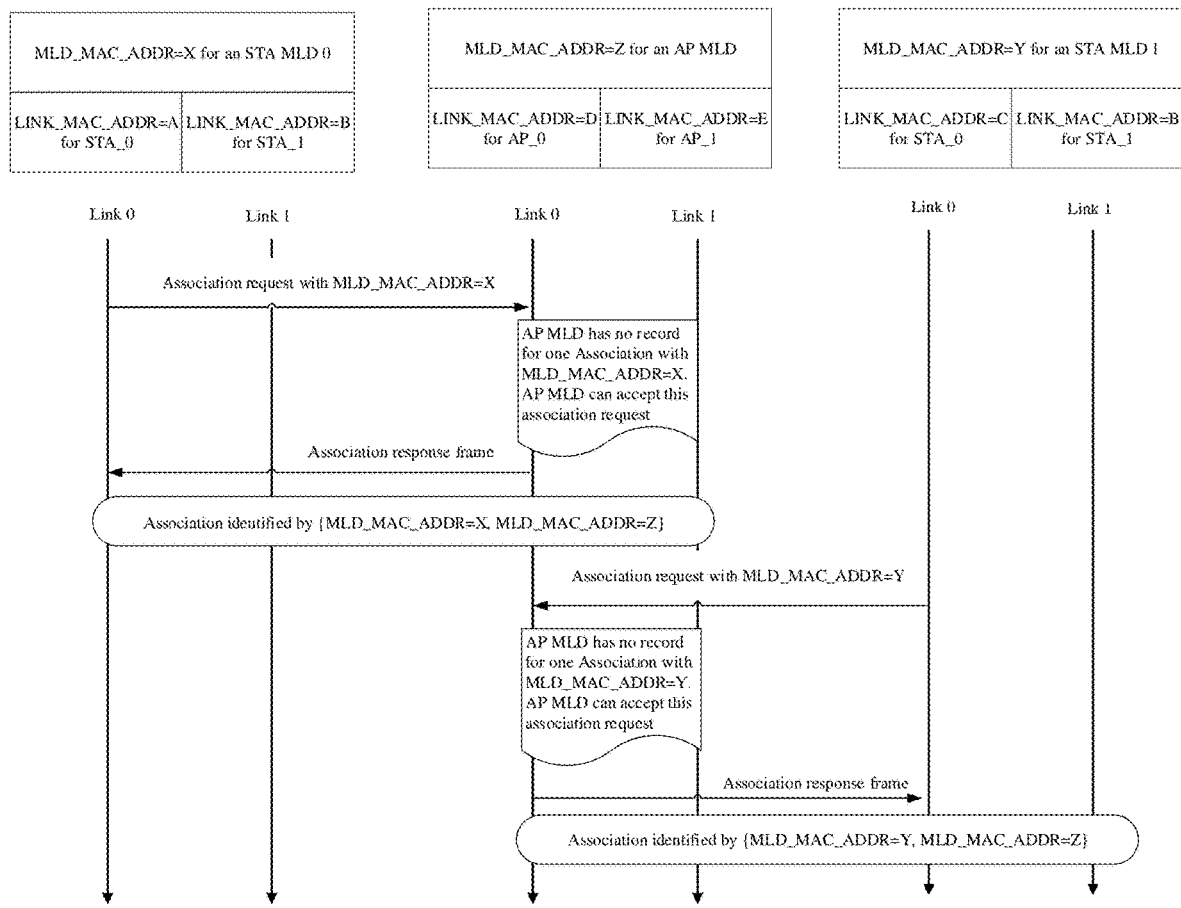
FIG. 7 is a flowchart of a method for establishing a multi-link association according to some exemplary embodiments of the present disclosure.

As shown in FIG. 7, the MLD MAC address of the STA MLD 0 is X, a link MAC address of a link 0 is A, and a link MAC address of a link 1 is B. The MLD MAC address of the STA MLD 1 is Y, a link MAC address of a link 0 is C, and a link MAC address of a link 1 is also B. In the process that the STA MLD 0 first performs the multi-link setup with the AP MLD on the link 0, the STA MLD 0 transmits an association request frame to the AP MLD, which carries the MLD MAC address=X of the STA MLD 0. The AP MLD has detected that there is currently no record for an association with the MLD MAC ADDR=X. Therefore, the AP MLD may accept the association request and set up multiple links to the STA MLD 0 on the link 0/the link 1. On an AP MLD side, this association is identified by using the MLD MAC ADDR=X, and an association response frame is transmitted to the STA MLD 0. The association response frame indicates that the multi-link association is successfully established between the AP MLD and the STA MLD 0. In the process that the STA MLD 1 performs the multi-link setup with the AP MLD on the link 0, the STA MLD 1 transmits an association request frame to the AP MLD, which carries the MLD MAC address=Y of the STA MLD 1. The AP MLD has detected that there is currently no record for an association with the MLD MAC ADDR=Y. Therefore, the AP MLD may accept the association request and set up multiple links to the STA MLD 1 on the link 0/the link 1. On the AP MLD side, this association is identified by using the MLD MAC ADDR=Y, and an association response frame is transmitted to the STA MLD 1. The association response frame indicates that the multi-link association is successfully established between the AP MLD and the STA MLD 1.

As shown in FIG. 7, after both the STA MLD 0 and the STA MLD 1 establish the association with the AP MLD, the STA MLD 0 and the STA MLD 1 have a same link MAC address for the link 1. Therefore, in the case that the AP MLD receives an 802.11 frame on the link 1, and the 802.11 frame carries LINK MAC ADDR=B, the AP MLD fails to distinguish whether the 802.11 frame comes from the STA MLD 0 or the STA MLD 1. Similarly, in the case that the AP MLD transmits an 802.11 frame carrying LINK MAC ADDR=B, the STA MLD 0 considers that the 802.11 frame is transmitted to the STA MLD 0, and the STA MLD 1 considers that the 802.11 frame is transmitted to the STA MLD 1.

In response to the above problem, the embodiments of the present disclosure provide a method. In the method, during establishment of a multi-link association, a possibility that different STAs may have the same link MAC address is considered. An association response frame is transmitted based on a link MAC address carried in an association request frame transmitted by an STA MLD. Whether to accept the association request is determined depending on whether the link MAC address in the association request frame is the same as a link MAC address of an associated STA, so as to generate and transmit the association response frame.

As shown in FIG. 8, the MLD MAC address of the STA MLD 0 is X, the link MAC address of the link 0 is A, and the link MAC address of the link 1 is B. The MLD MAC address of the STA MLD 1 is Y, the link MAC address of the link 0 is C, and the link MAC address of the link 1 is also B. After the STA MLD 0 establishes the association with the AP MLD, the STA MLD 1 transmits an association request to the AP MLD, which carries two link MAC addresses of the STA MLD 1: Link MAC Address=C and Link MAC Address=B. The AP MLD finds that Link MAC Address=B is the same as the link MAC address of the link 1 of the associated STA MLD 0, and there is no link MAC address that is the same as Link MAC Address-C in the associated STA. Based on this situation, the AP MLD may generate an association response frame indicating a successful association, and indicate to the STA MLD 1 that an association with the link 0 is successful but an association with the link 1 fails. Alternatively, the AP MLD may generate an association response frame indicating a failed association.

FIG. 9 is a flowchart of a method for establishing a multi-link association according to some exemplary embodiments of the present disclosure. The method is applicable to an AP MLD in a communication system shown in FIG. 1. The method may include the following steps.

In step 901, an association request frame transmitted by at least one STA MLD is received. The association request frame includes a group of link MAC addresses, and the group of link MAC addresses include a link MAC address of a link with which the STA MLD requests to establish an association.

In some exemplary embodiments, the AP device receives at least one association request frame from the at least one STA MLD.

Upon receiving one association request frame from one STA MLD, the AP device transmits an association response frame to the one STA MLD based on a group of link MAC addresses in the one association request frame.

Upon receiving at least two association request frames transmitted by at least two STA MLDs, the AP device transmits an association response frame to each of the at least two STA MLDs based on at least two groups of link MAC addresses in the at least two association request frames.

In some exemplary embodiments, the AP MLD may receive the association request frames transmitted by the at least two STA MLDs at a same time point or at different time points. That is, a difference between time points at which the AP MLD receives the at least two association request frames is less than a time threshold. For example, the AP MLD simultaneously processes the at least two association request frames and determines at least two association response frames that need to be transmitted.

The association request frame is transmitted to the AP MLD to request establishment of a multi-link association. The association request frame carries the link MAC address of the link with which the STA MLD requests to establish the association.

The link MAC address may also be referred to as a WM MAC address.

In some exemplary embodiments, as shown in FIG. 5, the association request frame includes MLD level information (STA MLD level information) and link level information (STA link level information). The MLD level information includes an MLD MAC address of the STA MLD, which is also known as a device MAC address. The link level information includes information corresponding to each link requested by the STA MLD. Information corresponding to one link includes a link ID and a link MAC address that is of the one link and corresponds to the STA MLD.

In some exemplary embodiments, the AP MLD broadcasts a link ID of the AP MLD to the STA MLD. Where the STA MLD needs to establish the multi-link association, the STA MLD carries a link ID of the link with which the STA MLD wants to establish the association and a link MAC address that is of the link and corresponds to the STA MLD in the association request frame.

In some exemplary embodiments, the group of link MAC addresses include at least one link MAC address of at least one link with which the STA MLD requests to establish an association, or at least two link MAC addresses of at least two links with which the STA MLD requests to establish an association.

In step 902, an association response frame is transmitted to the at least one STA MLD based on the link MAC address in the association request frame.

In some exemplary embodiments, the AP MLD transmits an association response frame to each STA MLD based on link MAC addresses in all received association request frames. Alternatively, the AP device transmits an association response frame to one STA MLD (for example, a first STA MLD) based on a link MAC address in an association request frame of the one STA MLD (for example, the first STA MLD).

The association response frame is used to feed back an association result of the multi-link association to the STA MLD.

In some exemplary embodiments, the association response frame carries a status code used to identify the association result, for example, the status code includes association failure information or association success information.

In some exemplary embodiments, in the case of a failed association, the status code indicates a reason for the failed association, for example, the reason for the failed association is a link MAC address conflict.

In some exemplary embodiments, the status code includes a device level status code, or includes a device level status code and a link level status code.

The device level status code is used to identify whether the STA MLD and the AP MLD have successfully established the multi-link association. Alternatively, the device level status code is used to identify whether the STA MLD and the AP MLD have successfully established an association with a first link (which is a link for transmitting the association request frame).

The link level status code is used to identify whether the STA MLD and the AP MLD have successfully established an association with a link.

In some exemplary embodiments, in the case of a successful association, as shown in FIG. 6, the association response frame includes a device level status code 601, MLD level information (AP MLD level information), and link level information (AP link level information). In the case of the failed association, the association response frame includes the device level status code and the MLD level information, or the association response frame includes the device level status code, the MLD level information, and the link level information. In other words, in the case of the failed association, the association response frame may or may not carry link level information corresponding to each link requested in the association request frame.

In the case of the successful association, the AP MLD indicates an association state of each link to the STA MLD. In the case of the failed association, the AP MLD may or may not indicate to the STA MLD whether each link is successfully associated.

The MLD level information in the association response frame includes an MLD MAC address of the AP MLD.

The link level information in the association response frame includes a link ID of each link in the association request frame, a link MAC address that is of the link and corresponds to the AP MLD, and a link level status code of the link.

In some exemplary embodiments, in the case that the association response frame includes the link level information, the link level information in the association response frame one-to-one corresponds to the link level information in the association request frame. For example, link IDs in the association response frame one-to-one correspond to link IDs in the association request frame.

In some exemplary embodiments, as shown in FIG. 5, the link level information in the association request frame includes: a link ID of a link 0, a link MAC address that is of the link 0 and corresponds to the STA MLD, a link ID of a link 1, and a link MAC address that is of the link 1 and corresponds to the STA MLD. Therefore, as shown in FIG. 6, the link level information in the association response frame includes: the link ID of the link 0, a link MAC address that is of the link 0 and corresponds to the AP MLD, a link level status code of the link 0, the link ID of the link 1, a link MAC address that is of the link 1 and corresponds to the AP MLD, and a link level status code of the link 1.

In conclusion, in the method according to the embodiments, during establishment of a multi-link association, an AP MLD transmits an association response frame based on a link MAC address carried by an STA MLD in an association request frame. In response to the problem that different STA MLDs may have the same link MAC address, based on the link MAC address in the association request frame, the AP MLD identifies whether there is another STA with the same link MAC address, and then determines whether to accept the corresponding association request and transmits the association response frame to the STA MLD.

Figure 10:
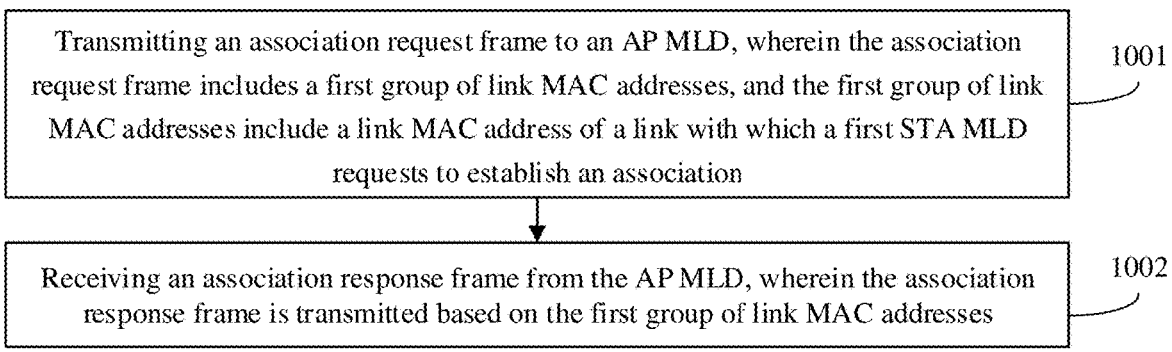
FIG. 10 is a flowchart of a method for establishing a multi-link association according to some exemplary embodiments of the present disclosure.

FIG. 10 is a flowchart of a method for establishing a multi-link association according to some exemplary embodiments of the present disclosure. The method is applicable to an STA MLD in a communication system shown in FIG. 1. The STA MLD may be a first STA MLD. The method may include the following steps.

In step 1001, an association request frame is transmitted to an AP MLD. The association request frame includes a first group of link MAC addresses, and the first group of link MAC addresses include a link MAC address of a link with which the first STA MLD requests to establish an association.

In some exemplary embodiments, the first group of link MAC addresses include link MAC addresses that are of a first group of links and correspond to the STA MLD, and the first group of links are links with which the first STA MLD requests to establish an association. For example, the association request frame transmitted by the first STA MLD includes a link ID of each link in the first group of links, and a link MAC address that is of the link and corresponds to the first STA MLD.

In some exemplary embodiments, the first group of link MAC addresses include a link MAC address with which the first STA MLD requests to establish an association.

In step 1002, an association response frame transmitted by the AP MLD is received. The association response frame is transmitted based on the first group of link MAC addresses.

In conclusion, in the method according to the embodiments, during establishment of a multi-link association, an AP MLD transmits an association response frame based on a link MAC address carried by an STA MLD in an association request frame. In response to the problem that different STA MLDs may have the same link MAC address, based on the link MAC address in the association request frame, the AP MLD identifies whether there is an associated STA with the same link MAC address, and then determines whether to accept the corresponding association request and transmits the association response frame to the STA MLD.

In some exemplary embodiments, the following two cases will be illustrated below separately:

Case (I): An AP MLD determines an association response frame of one STA MLD based on an association request frame transmitted by the one STA MLD.

Case (II): An AP MLD determines an association response frame of one of a plurality of STA MLDs based on association request frames transmitted by the plurality of STA MLDs.

In the case (I), the one STA MLD is referred to as a first STA MLD.

The association request frame transmitted by the first STA MLD includes a first group of link MAC addresses. The AP MLD transmits the association response frame to the first STA MLD depending on whether the first group of link MAC addresses are the same as a link MAC address of an associated STA.

In the case (II), a first STA MLD in a plurality of STA MLDs is taken as an example for illustration. For other STA MLDs in the plurality of STA MLDs, processing may be performed according to a method shown for the first STA MLD. That is, the plurality of STA MLDs are divided into the first STA MLD and the other STA MLDs, and the other STA MLDs include at least one STA MLD.

An association request frame transmitted by the first STA MLD includes a first group of link MAC addresses. Association request frames transmitted by the other STA MLDs include a third group of link MAC addresses. The AP MLD transmits an association response frame to the first STA MLD depending on whether the first group of link MAC addresses are the same as a fourth group of link MAC addresses. The fourth group of link MAC addresses include the third group of link MAC addresses and a link MAC address of an associated STA.

Case (I): An AP MLD Determines an Association Response Frame of One STA MLD Based on an Association Request Frame Transmitted by the One STA MLD.

Figure 11:
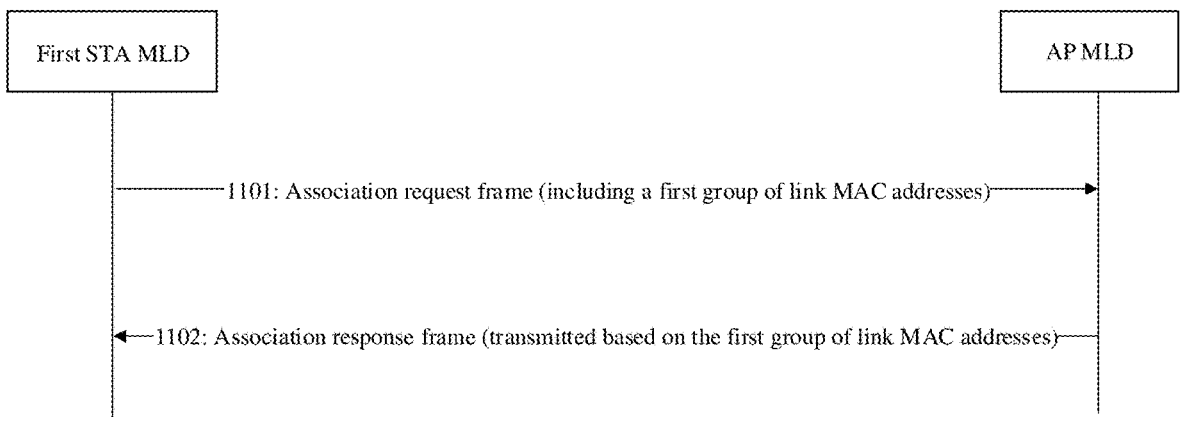
FIG. 11 is a flowchart of a method for establishing a multi-link association according to some exemplary embodiments of the present disclosure.

FIG. 11 is a flowchart of a method for establishing a multi-link association according to some exemplary embodiments of the present disclosure. The method is applicable to a communication system shown in FIG. 1. The communication system includes a first STA MLD and an AP MLD. The method may include the following steps.

In step 1101, the first STA MLD transmits an association request frame to the AP MLD. The association request frame carries a first group of link MAC addresses.

In the embodiments, a following case is not excluded: The AP MLD receives association request frames from a plurality of STA MLDs, but processes the association request frames independently. That is, the AP MLD receives at least two association request frames, but transmits an association response frame to one STA MLD based on a link MAC address in an association request frame transmitted by the one STA MLD.

In some exemplary embodiments, the association request frame further includes an STA MLD MAC address of the first STA MLD.

In some exemplary embodiments, the first group of link MAC addresses are link MAC addresses of a first group of links with which the first STA MLD requests to establish an association. The first group of links include a first link for transmitting the association request frame, or a first link for transmitting the association request frame and other links.

That is, the first group of link MAC addresses include a first link MAC address of the first link, and the first link is a link for transmitting the association request frame.

In some exemplary embodiments, the first group of link MAC addresses include a first link MAC address of the first link and other link MAC addresses. The first link is a link for transmitting the association request frame, and the other link MAC addresses include a link MAC address other than the first link MAC address in the first group of link MAC addresses.

In step 1102, the AP MLD transmits an association response frame to the first STA MLD depending on whether the first group of link MAC addresses are the same as a second group of link MAC addresses.

In some exemplary embodiments, the AP MLD checks whether the first group of link MAC addresses are the same as the second group of link MAC addresses.

The second group of link MAC addresses include a link MAC address of an STA that has established an association with the AP MLD. For example, the second group of link MAC addresses include a link MAC address of an STA device that has established an association with the AP MLD and/or a link MAC address of an STA MLD that has established an association with the AP MLD.

In some exemplary embodiments, the second group of link MAC addresses include at least one link MAC address. For example, the second group of link MAC addresses may be a null set/be null, in other words, the second group of link MAC addresses do not exist.

The AP MLD transmits the association response frame to the first STA MLD depending on whether the first group of link MAC addresses are the same as the second group of link MAC addresses.

In some exemplary embodiments, in the case that the first group of link MAC addresses are different from the second group of link MAC addresses, and the AP MLD may accept the association request on the first group of links, the AP MLD transmits an association response frame indicating a successful association to the first STA MLD. The first group of link MAC addresses being different from the second group of link MAC addresses means that there is no same link MAC address in the second group of link MAC addresses as any link MAC address in the first group of link MAC addresses.

In some exemplary embodiments, in the case that the first group of link MAC addresses include at least one link MAC address different from the second group of link MAC addresses, and the AP MLD may accept the association request on links with different link MAC addresses, the AP MLD transmits the association response frame indicating the successful association to the first STA MLD, or transmits an association response frame indicating a failed association to the STA MLD. The first group of link MAC addresses including the at least one link MAC address different from the second group of link MAC addresses means that the first group of link MAC addresses include one link MAC address different from any link MAC address in the second group of link MAC addresses.

In some exemplary embodiments, in the case that the second group of link MAC addresses include the first group of link MAC addresses, the AP MLD transmits the association response frame indicating the failed association to the first STA MLD. The second group of link MAC addresses including the first group of link MAC addresses means that the first group of link MAC addresses are a subset of the second group of link MAC addresses, or that there is a same link MAC address in the second group of link MAC addresses as any link MAC address in the first group of link MAC addresses.

In some exemplary embodiments, the association request frame further includes the STA MLD MAC address of the first STA MLD. The AP MLD transmits the association response frame to the first STA MLD based on the STA MLD MAC address and the first group of link MAC addresses.

In the case that in an associated device MAC address, there is no device MAC address the same as the STA MLD MAC address, the AP MLD performs the step 1102. The associated device MAC address includes a device MAC address of the STA (STA device and/or STA MLD) that has established the association with the AP MLD.

In some exemplary embodiments, in the case that in the device MAC address of the associated STA or STA MLD, there is no device MAC address the same as the STA MLD MAC address, the AP MLD transmits the association response frame to the first STA MLD depending on whether the first group of link MAC addresses are the same as the second group of link MAC addresses.

In the case that in an associated device MAC address, there is a device MAC address the same as the STA MLD MAC address, the AP MLD transmits the association response frame to the first STA MLD. The association response frame indicates the failed association.

In some exemplary embodiments, the AP MLD transmits the association response frame to the first STA MLD depending on whether the first link MAC address is the same as a link MAC address in the second group of link MAC addresses. Alternatively, the AP MLD transmits the association response frame to the first STA MLD depending on whether the first link MAC address is the same as a link MAC address in the second group of link MAC addresses and whether the other link MAC addresses are the same as the second group of link MAC addresses.

In some exemplary embodiments, the other links include at least one link. In other words, the other link MAC addresses include at least one link MAC address.

Referring to Table 1, regarding whether the first link MAC address is the same as a link MAC address in the second group of link MAC addresses, and whether the other link MAC addresses are the same as the second group of link MAC addresses, the embodiments of the present disclosure illustrate the following six cases, which are explained separately below. The embodiments of the present disclosure are not limited to the following six cases.

TABLE 1

| Case | First link MAC address | Other link MAC addresses | Association response frame |
|---|---|---|---|
| Case 1 | Same | — | Failed association |
| Case 2 | Same | Different | Successful association |

TABLE 1-continued

| Case | First link MAC address | Other link MAC addresses | Association response frame |
|---|---|---|---|
| Case 3 | Same | Partially different | Successful association |
| Case 4 | Different | Partially the same | Successful association |
| Case 5 | Different | Partially the same | Failed association |
| Case 6 | Same | Same | Failed association |

Case 1

The first group of link MAC addresses include the first link MAC address of the first link, and the first link is the link for transmitting the association request frame.

In the case that the first link MAC address is the same as a link MAC address in the second group of link MAC addresses, the AP MLD transmits the association response frame to the first STA MLD, wherein the association response frame indicates the failed association.

In some exemplary embodiments in the case that the first link MAC address is different from any link MAC address in the second group of link MAC addresses, the AP MLD transmits the association response frame to the first STA MLD, wherein the association response frame indicates the successful association.

In some exemplary embodiments, in the case that a link MAC address of the link for transmitting the association request frame is the same as the link MAC address of the associated STA, the AP MLD transmits the association response frame indicating the failed association to the first STA MLD. In the case that the link MAC address of the link for transmitting the association request frame is different from the link MAC address of the associated STA, the AP MLD transmits the association response frame indicating the successful association to the first STA MLD.

In some exemplary embodiments, the association response frame may or may not carry link level information of each link requested by the first STA MLD. The link level information includes a link level status code.

The association response frame includes a device level status code, or includes a device level status code and the link level status code. The device level status code indicates a failed device association, and the link level status code indicates a link association result.

In some exemplary embodiments, the device level status code indicates a link MAC address conflict. For a link that fails to be associated, the link level status code indicates the link MAC address conflict.

That is, in the case that the AP MLD finds that a link MAC address corresponding to a link (first link) on which an STA MLD transmits an association request is the same as a link MAC address corresponding to another STA MLD or STA (STA device) that has established an association with the AP MLD, the AP MLD rejects multi-link setup initiated by the STA MLD, and indicates that the multi-link setup fails in an association response frame replied to the STA MLD, in other words, the AP MLD sets an MLD Level Status Code field in the association response frame to unsuccessful information (association failure information). In the association response, the AP MLD may not carry corresponding link level information of each link requested by the STA MLD, or carry the corresponding link level information of each link requested by the STA MLD and set a corresponding status code of each link. The AP MLD marks the unsuccessful information carried in the MLD Level Status Code field with the link MAC address conflict.

Figure 12:
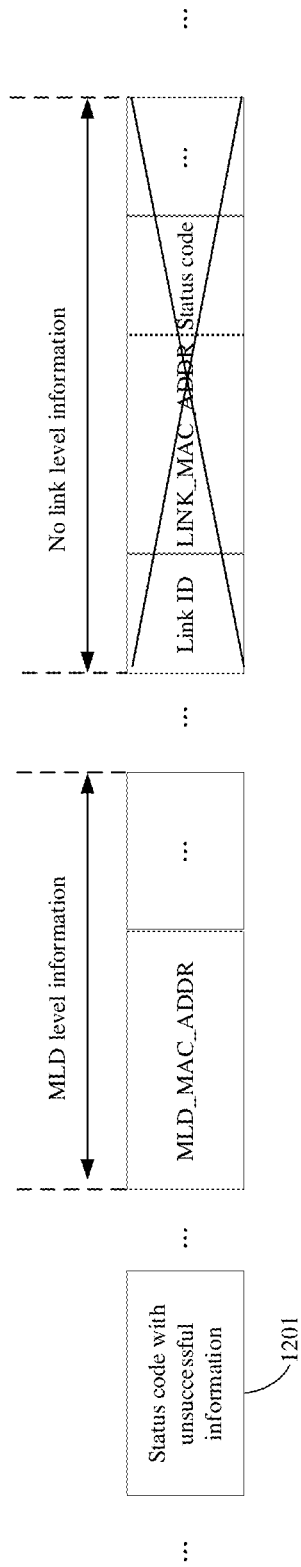
FIG. 12 is a schematic diagram of an association response frame according to some exemplary embodiments of the present disclosure.

In some exemplary embodiments, as shown in FIG. 12, the association response transmitted by the AP MLD carries the device level status code only. The device level status code includes association failure information 1201, indicating that the AP MLD rejects an entire multi-link association request (multi-link setup). The association response does not carry the link level information, in other words, does not carry the link level status code.

Figure 13:
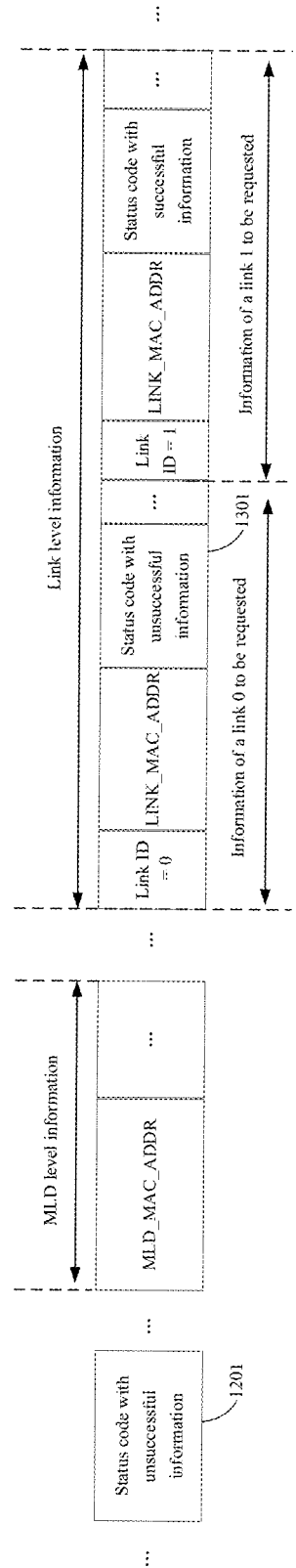
FIG. 13 is a schematic diagram of an association response frame according to some exemplary embodiments of the present disclosure.

In some exemplary embodiments, as shown in FIG. 13, the association response transmitted by the AP MLD carries the device level status code. The device level status code includes the association failure information 1201, indicating that the AP MLD rejects the entire multi-link association request. The association response also carries the corresponding link level information of each link requested by the STA MLD, and the status code of each link, namely, a link level status code 1301. Assuming that the STA MLD transmits the association request frame on a link 0, a link MAC address of the link 0 is the same as the link MAC address of the associated STA, and a link MAC address of a link 1 is different from the link MAC address of the associated STA, in the association response frame, the AP MLD indicates the association failure information in a link level status code (link level status code 1301) of the link 0, and indicates association success information in a link level status code of the link 1.

Case 2

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is the same as a link MAC address in the second group of link MAC addresses, and the other link MAC addresses are different from the second group of link MAC addresses, the AP MLD transmits the association response frame to the first STA MLD, wherein the association response frame indicates the successful association.

In some exemplary embodiments, the first link MAC address being the same as the one link MAC address in the second group of link MAC addresses means that the second group of link MAC addresses include a link MAC address that is the same as the first link MAC address.

The other link MAC addresses being different from the second group of link MAC addresses means that there is no same link MAC address in the second group of link MAC addresses as any link MAC address in the other link MAC addresses.

The association response frame includes a device level status code and a link level status code. The device level status code indicates a successful device association, and the link level status code indicates a link association result.

That is, in the case that the AP MLD finds that link MAC addresses of other links (other link MAC addresses) requested by an STA MLD are different from a link MAC address corresponding to any STA MLD or STA that has established an association with the AP MLD, and the AP MLD may accept an association request of the corresponding STA MLD on the other links, the AP MLD accepts a multi-link association request of the STA MLD, and indicates that a current multi-link association is successful in an association response frame replied to the STA MLD. In other words, the AP MLD sets an MLD Level Status Code field in the association response frame to association success information, carries corresponding link level information of each link requested by the STA MLD in the association response frame, and sets a corresponding status code of each link.

Figure 14:
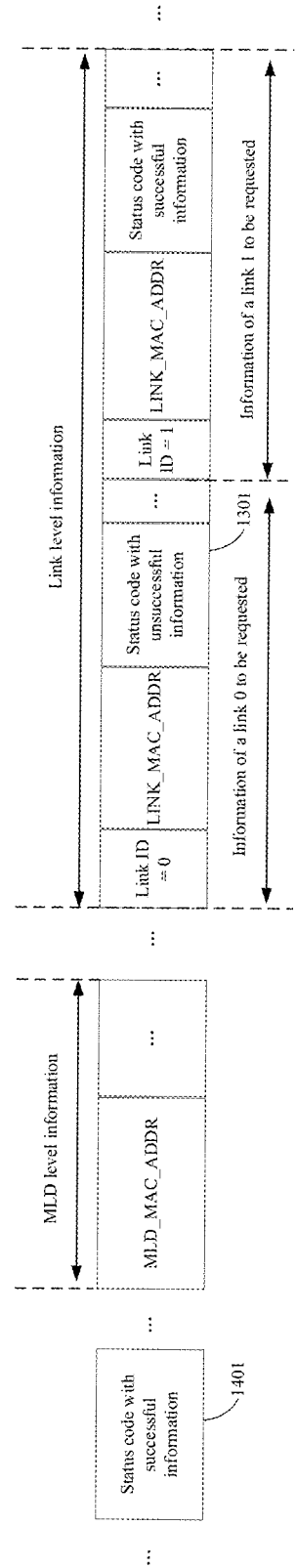
FIG. 14 is a schematic diagram of an association response frame according to some exemplary embodiments of the present disclosure.

As shown in FIG. 14, the association response frame transmitted by the AP MLD carries the device level status code. The device level status code includes association success information 1401, indicating that the AP MLD accepts the entire multi-link association request. In addition, the association response frame also carries the corresponding link level information of each link requested by the STA MLD, and includes the status code of each link, namely, a link level status code 1301. Assuming that the STA MLD transmits the association request frame on a link 0, a link MAC address of the link 0 is the same as the link MAC address of the associated STA, and a link MAC address of a link 1 is different from the link MAC address of the associated STA, in the association response frame, the AP MLD indicates association failure information in a link level status code of the link 0, and indicates the association success information in a link level status code of the link 1.

Case 3

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is the same as a link MAC address in the second group of link MAC addresses, and the other link MAC addresses include at least one link MAC address different from the second group of link MAC addresses, the AP MLD transmits the association response frame to the first STA MLD, wherein the association response frame indicates the successful association.

In some exemplary embodiments, the first link MAC address being the same as a link MAC address in the second group of link MAC addresses means that the second group of link MAC addresses include a link MAC address that is the same as the first link MAC address.

In some exemplary embodiments, the other link MAC addresses including at least one link MAC address different from the second group of link MAC addresses means that the other link MAC addresses include at least one link MAC address different from any link MAC address in the second group of link MAC addresses.

The association response frame includes a device level status code and a link level status code. The device level status code indicates a successful device association, and the link level status code indicates a link association result.

That is, in the case that the AP MLD finds that a link MAC address of one of other links (other link MAC addresses) requested by an STA MLD is different from a link MAC address corresponding to any STA MLD or STA that has established an association with the AP MLD, and the AP MLD may accept an association request of the corresponding STA MLD on the one link, the AP MLD accepts a multi-link association request of the STA MLD, and indicates that a current multi-link association is successful in an association response frame replied to the STA MLD. In other words, the AP MLD sets an MLD Level Status Code field in the association response frame to association success information, carries corresponding link level information of each link requested by the STA MLD in the association response frame, and sets a corresponding status code of each link.

Case 4

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is different from the second group of link MAC addresses, and the other link MAC addresses include at least one link MAC address that exists in the second group of link MAC addresses, the AP MLD transmits the association response frame to the first STA MLD, wherein the association response frame indicates the successful association.

In some exemplary embodiments, the first link MAC address being different from the second group of link MAC addresses means that any link MAC address in the second group of link MAC addresses is different from the first link MAC address.

In some exemplary embodiments, the other link MAC addresses including the at least one link MAC address that exists in the second group of link MAC addresses means that the other link MAC addresses include at least one link MAC address that is the same as a link MAC address in the second group of link MAC addresses.

The association response frame includes a device level status code and a link level status code. The device level status code indicates a successful device association, and the link level status code indicates a link association result.

That is, in the case that the AP MLD finds that a corresponding link MAC address (first link MAC address) of a link (first link) on which an STA MLD transmits an association request is different from a link MAC address corresponding to any STA MLD or STA that has established an association with the AP MLD, but corresponding link MAC addresses of other links (other link MAC addresses) requested by the STA MLD are the same as a link MAC address corresponding to another STA MLD or STA that has established an association with the AP MLD, the AP MLD accepts a multi-link setup request of the STA MLD, indicating that a current multi-link association is successful in an association response frame replied to the STA MLD. In other words, the AP MLD sets an MLD Level Status Code field in the association response frame to association success information, carries corresponding link level information of each link requested by the STA MLD in the association response frame, and sets a status code of each link.

Figure 15:
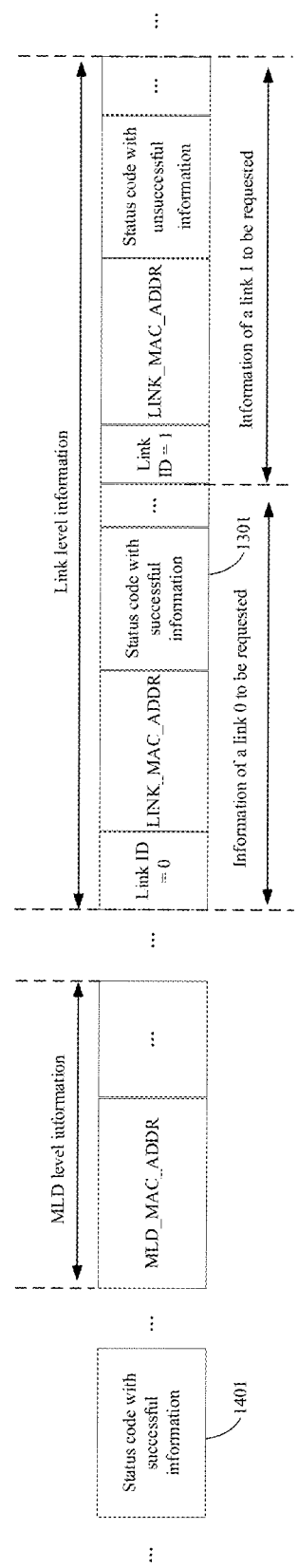
FIG. 15 is a schematic diagram of an association response frame according to some exemplary embodiments of the present disclosure.

As shown in FIG. 15, the association response frame transmitted by the AP MLD carries the device level status code. The device level status code includes association success information 1401, indicating that the AP MLD accepts an entire multi-link association request. In addition, the association response frame also carries the corresponding link level information of each link requested by the STA MLD, and includes the status code of each link, namely, a link level status code 1301. Assuming that the STA MLD transmits the association request frame on a link 0, a link MAC address of the link 0 is different from the link MAC address of the associated STA, and a link MAC address of a link 1 is the same as the link MAC address of the associated STA, in the association response frame, the AP MLD indicates the association success information in a link level status code of the link 0, and indicates association failure information in a link level status code of the link 1.

Case 5

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is different from the second group of link MAC addresses, and the other link MAC addresses include at least one link MAC address that exists in the second group of link MAC addresses, the AP MLD transmits the association response frame to the first STA MLD, wherein the association response frame indicates the failed association.

In some exemplary embodiments, the first link MAC address being different from the second group of link MAC addresses means that any link MAC address in the second group of link MAC addresses is different from the first link MAC address.

In some exemplary embodiments, the other link MAC addresses including the at least one link MAC address that exists in the second group of link MAC addresses means that the other link MAC addresses include at least one link MAC address that is the same as a link MAC address in the second group of link MAC addresses.

In some exemplary embodiments, the association response frame may or may not carry link level information of each link requested by the first STA MLD. The link level information includes a link level status code.

The association response frame includes a device level status code, or includes a device level status code and the link level status code. The device level status code indicates a failed device association, and the link level status code indicates a link association result.

In some exemplary embodiments, the device level status code indicates a link MAC address conflict. For a link that fails to be associated, the link level status code indicates the link MAC address conflict.

That is, in the case that the AP MLD finds that a corresponding link MAC address (first link MAC address) of a link (first link) on which an STA MLD transmits an association request is different from a link MAC address corresponding to any STA MLD or STA that has established an association with the AP MLD, but corresponding link MAC addresses of other links (other link MAC addresses) requested by the STA MLD are the same as a link MAC address corresponding to another STA MLD or STA that has established an association with the AP MLD, the AP MLD rejects a multi-link setup request of the STA MLD, and indicates that a current multi-link association fails in an association response frame replied to the STA MLD. In other words, the AP MLD sets an MLD Level Status Code field in the association response frame to association failure information. In the association response frame, the AP MLD may not carry corresponding link level information of each link requested by the STA MLD, or may carry the corresponding link level information of each link requested by the STA MLD, and sets a status code of each link (link level status code). The AP MLD marks the association failure information carried in the MLD Level Status Code field with the link MAC address conflict.

Figure 16:
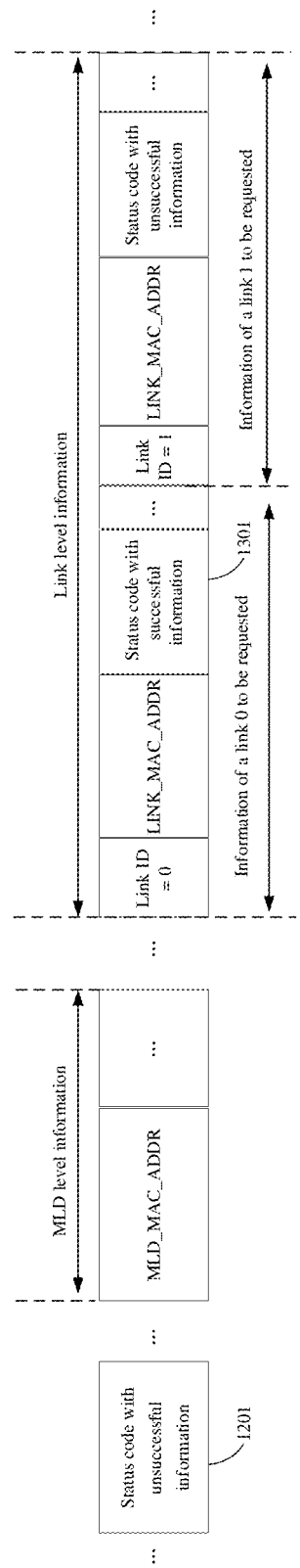
FIG. 16 is a schematic diagram of an association response frame according to some exemplary embodiments of the present disclosure.

As shown in FIG. 16, the association response frame transmitted by the AP MLD carries the device level status code. The device level status code includes association failure information 1201, indicating that the AP MLD rejects an entire multi-link association request. The association response frame also carries the corresponding link level information of each link requested by the STA MLD, and the status code of each link, namely, a link level status code 1301. Assuming that the STA MLD transmits the association request frame on a link 0, a link MAC address of the link 0 is different from the link MAC address of the associated STA, and a link MAC address of a link 1 is the same as the link MAC address of the associated STA, in the association response frame, the AP MLD indicates association success information in a link level status code of the link 0, and the association failure information in a link level status code of the link 1.

Case 6

In the case that the second group of link MAC addresses include a same link MAC address as any link MAC address in the first group of link MAC addresses, the AP MLD transmits the association response frame to the first STA MLD, wherein the association response frame indicates the failed association.

In some exemplary embodiments, the second group of link MAC addresses including a same link MAC address as any link MAC address in the first group of link MAC addresses means that the first group of link MAC addresses are a subset of the second group of link MAC addresses, or the second group of link MAC addresses include the first group of link MAC addresses.

In other words, the second group of link MAC addresses include a link MAC address that is the same as the first link MAC address; and the second group of link MAC addresses include a same link MAC address as any link MAC address in the other link MAC addresses.

In some exemplary embodiments, the association response frame may or may not carry link level information of each link requested by the first STA MLD. The link level information includes a link level status code.

The association response frame includes a device level status code, or includes a device level status code and the link level status code. The device level status code indicates a failed device association, and the link level status code indicates a link association result.

In some exemplary embodiments, the device level status code indicates a link MAC address conflict. For a link that fails to be associated, the link level status code indicates the link MAC address conflict.

That is, in the case that the AP MLD finds that a link MAC address of each link requested by an STA MLD is the same as a link MAC address corresponding to at least one STA MLD or STA that has established an association with the AP MLD, the AP MLD rejects a multi-link association request of the STA MLD, and indicates that a current multi-link association fails in an association response frame replied to the STA MLD, in other words, the AP MLD sets an MLD Level Status Code field in the association response frame to association failure information. In the association response frame, the AP MLD may not carry corresponding link level information of each link requested by the STA MLD, or may carry the corresponding link level information of each link requested by the STA MLD, and sets a status code of each link. The AP MLD marks the association failure information carried in the MLD Level Status Code field with the link MAC address conflict.

Figure 17:
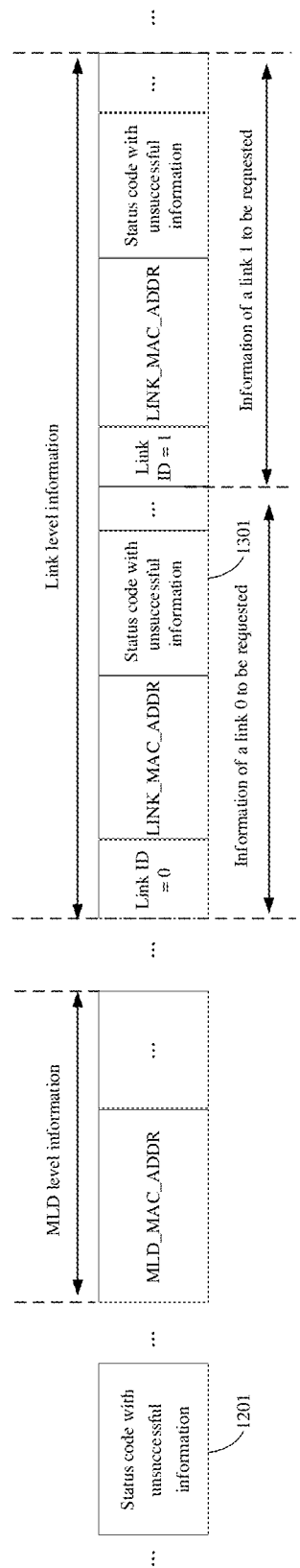
FIG. 17 is a schematic diagram of an association response frame according to some exemplary embodiments of the present disclosure.

As shown in FIG. 17, the association response frame transmitted by the AP MLD carries the device level status code. The device level status code includes association failure information 1201, indicating that the AP MLD rejects the entire multi-link association request. The association response frame also carries the corresponding link level information of each link requested by the STA MLD, and the status code of each link, namely, a link level status code 1301. Assuming that the STA MLD transmits the association request frame on a link 0, a link MAC address of the link 0 is the same as the link MAC address of the associated STA, and a link MAC address of a link 1 is the same as the link MAC address of the associated STA, in the association response frame, the AP MLD indicates the association failure information in a link level status code of the link 0, and indicates the association failure information in a link level status code of the link 1.

In conclusion, in the method according to the embodiments, in the process that an STA MLD and an AP MLD perform multi-link setup, the AP MLD needs to detect corresponding link MAC addresses of all links requested by the STA MLD to determine whether the detected link MAC addresses are the same as a corresponding link MAC address of at least one STA MLD or STA that has established an association with the AP MLD.

In the case that a link MAC address corresponding to a link on which the STA MLD transmits an association request frame is the same as a link MAC address corresponding to another STA MLD or STA that has established an association with the AP MLD, the AP MLD rejects a multi-link association request of the STA MLD, or the AP MLD conditionally accepts an association request transmitted by the STA MLD on some links.

In the case that link MAC addresses corresponding to other links than the link on which the STA MLD transmits the association request frame are the same as a link MAC address corresponding to another at least one STA MLD or STA that has established an association with the AP MLD, the AP MLD rejects the multi-link association request of the STA MLD, or the AP MLD conditionally accepts the association request transmitted by the STA MLD on some links.

In the case that link MAC addressees corresponding to all links of the STA MLD are the same as a link MAC address corresponding to another at least one STA MLD or STA that has established an association with the AP MLD, the AP MLD rejects the multi-link association request of the STA MLD.

During establishment of a multi-link association, whether a link MAC address of a link requested by the STA MLD is the same as a link MAC address of an associated STA is checked, and an association response frame is transmitted based on a check result. This prevents an STA that has established an association with the AP MLD from corresponding to a same link MAC address, thereby avoiding a frame interaction failure caused by the same link MAC address.

Case (II): An AP MLD Determines an Association Response Frame of One of a Plurality of STA MLDs Based on Association Request Frames Transmitted by the Plurality of STA MLDs.

Figure 18:
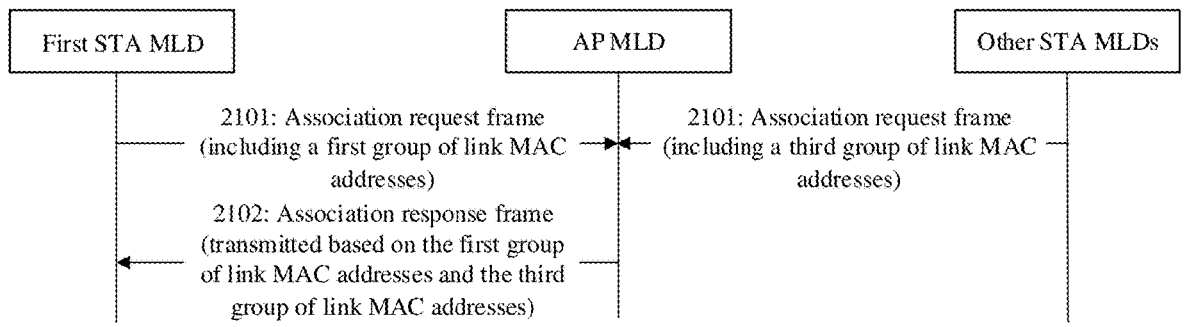
FIG. 18 is a flowchart of a method for establishing a multi-link association according to some exemplary embodiments of the present disclosure.

FIG. 18 is a flowchart of a method for establishing a multi-link association according to some exemplary embodiments of the present disclosure. The method is applicable to a communication system shown in FIG. 1. The communication system includes a first STA MLD, other STA MLDs, and an AP MLD. The other STA MLDs include at least one STA MLD. The method may include the following steps.

In step 2101, the first STA MLD and the other STA MLDs separately transmit an association request frame to the AP MLD. The association request frame transmitted by the first STA MLD carries a first group of link MAC addresses.

In some exemplary embodiments, the association request frame transmitted by the first STA MLD further includes an STA MLD MAC address of the first STA MLD. At least one association request frame transmitted by the other STA MLDs includes a third group of link MAC addresses.

In some exemplary embodiments, the first group of link MAC addresses are link MAC addresses of a first group of links with which the first STA MLD requests to establish an association. The first group of links include a first link for transmitting the association request frame, or a first link for transmitting the association request frame and other links.

That is, the first group of link MAC addresses include a first link MAC address of the first link, and the first link is a link for transmitting the association request frame.

In some exemplary embodiments, the first group of link MAC addresses include a first link MAC address of the first link and other link MAC addresses. The first link is a link for transmitting the association request frame, and the other link MAC addresses include a link MAC address other than the first link MAC address in the first group of link MAC addresses.

In step 2102, the AP MLD transmits an association response frame to the STA MLD depending on whether the first group of link MAC addresses are the same as a fourth group of link MAC addresses.

In some exemplary embodiments, the AP MLD checks whether the first group of link MAC addresses are the same as the fourth group of link MAC addresses.

The fourth group of link MAC addresses include a second group of link MAC addresses and the third group of link MAC addresses. The second group of link MAC addresses include a link MAC address of an STA that has established an association with the AP MLD. In some exemplary embodiments, the second group of link MAC addresses include a link MAC address of an STA device that has established an association with the AP MLD and/or a link MAC address of an STA MLD that has established an association with the AP MLD.

In some exemplary embodiments, the second group of link MAC addresses include at least one link MAC address. In some exemplary embodiments, the second group of link MAC addresses may be a null set/be null, in other words, the second group of link MAC addresses do not exist. The third group of link MAC addresses include at least one link MAC address. In some exemplary embodiments, the third group of link MAC addresses may be a null set/be null, in other words, the third group of link MAC addresses do not exist.

The AP MLD transmits the association response frame to the first STA MLD depending on whether the first group of link MAC addresses are the same as the fourth group of link MAC addresses.

In some exemplary embodiments, in the case that the first group of link MAC addresses are different from the fourth group of link MAC addresses, and the AP MLD may accept an association request on the first group of links, the AP MLD transmits an association response frame indicating a successful association to the first STA MLD. The first group of link MAC addresses being different from the fourth group of link MAC addresses means that there is no same link MAC address in the fourth group of link MAC addresses as any link MAC address in the first group of link MAC addresses.

In some exemplary embodiments, in the case that the first group of link MAC addresses include at least one link MAC address different from the fourth group of link MAC addresses, and the AP MLD may accept the association request on links with different link MAC addresses, the AP MLD transmits the association response frame indicating the successful association to the first STA MLD, or an association response frame indicating a failed association to the STA MLD. The first group of link MAC addresses including the at least one link MAC address different from the fourth group of link MAC addresses means that the first group of link MAC addresses include one link MAC address different from any link MAC address in the fourth group of link MAC addresses.

In some exemplary embodiments, in the case that the fourth group of link MAC addresses include the first group of link MAC addresses, the AP MLD transmits the association response frame indicating the failed association to the first STA MLD. The fourth group of link MAC addresses including the first group of link MAC addresses means that the first group of link MAC addresses are a subset of the fourth group of link MAC addresses, or that there is a same link MAC address in the fourth group of link MAC addresses as any link MAC address in the first group of link MAC addresses.

In some exemplary embodiments, the association request frame further includes the STA MLD MAC address of the first STA MLD. The AP MLD transmits the association response frame to the first STA MLD based on the STA MLD MAC address and the first group of link MAC addresses.

In the case that in an associated device MAC address, there is no device MAC address the same as the STA MLD MAC address, the AP MLD performs the step 2102. The associated device MAC address includes a device MAC address of the STA (STA device and/or STA MLD) that has established the association with the AP MLD.

In some exemplary embodiments, in the case that in the device MAC address of the associated STA device or STA MLD, there is no device MAC address the same as the STA MLD MAC address, the AP MLD transmits the association response frame to the first STA MLD depending on whether the first group of link MAC addresses are the same as the fourth group of link MAC addresses.

In some exemplary embodiments, in the case that in an associated device MAC address, there is a device MAC address the same as the STA MLD MAC address, the AP MLD transmits the association response frame to the first STA MLD. The association response frame indicates the failed association.

In some exemplary embodiments, the AP MLD transmits the association response frame to the first STA MLD depending on whether the first link MAC address exists in the fourth group of link MAC addresses. Alternatively, the AP MLD transmits the association response frame to the first STA MLD depending on whether the first link MAC address exists in the fourth group of link MAC addresses and whether the other link MAC addresses are the same as the fourth group of link MAC addresses.

In some exemplary embodiments, the other links include at least one link. In other words, the other link MAC addresses include at least one link MAC address.

Similar to the exemplary embodiment shown in FIG. 11, regarding whether the first link MAC address exists in the fourth group of link MAC addresses, and whether the other link MAC addresses are the same as the fourth group of link MAC addresses, six cases are illustrated, which are described separately below. The embodiments of the present disclosure are not limited to the following six cases.

Case 1

The first group of link MAC addresses include the first link MAC address of the first link, and the first link is the link for transmitting the association request frame.

In the case that the first link MAC address is the same as a link MAC address in the fourth group of link MAC addresses, the AP MLD transmits the association response frame to the first STA MLD, wherein the association response frame indicates the failed association.

In some exemplary embodiments, in the case that the first link MAC address is different from any link MAC address in the fourth group of link MAC addresses, the AP MLD transmits the association response frame to the first STA MLD, wherein the association response frame indicates the successful association.

In some exemplary embodiments, in the case that a link MAC address of the link for transmitting the association request frame is the same as the link MAC address of the associated STA, the AP MLD transmits the association response frame indicating the failed association to the first STA MLD; and in the case that the link MAC address of the link for transmitting the association request frame is different from the link MAC address of the associated STA, the AP MLD transmits the association response frame indicating the successful association to the first STA MLD.

In some exemplary embodiments, the association response frame may or may not carry link level information of each link requested by the first STA MLD. The link level information includes a link level status code.

The association response frame includes a device level status code, or includes a device level status code and the link level status code. The device level status code indicates a failed device association, and the link level status code indicates a link association result.

In some exemplary embodiments, the device level status code indicates a link MAC address conflict. For a link that fails to be associated, the link level status code indicates the link MAC address conflict.

Case 2

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is the same as a link MAC address in the fourth group of link MAC addresses, and the other link MAC addresses are different from the fourth group of link MAC addresses, the AP MLD transmits the association response frame to the first STA MLD, wherein the association response frame indicates the successful association.

Case 3

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is the same as a link MAC address in the fourth group of link MAC addresses, and the other link MAC addresses include at least one link MAC address different from the fourth group of link MAC addresses, the AP MLD transmits the association response frame to the first STA MLD, wherein the association response frame indicates the successful association.

Case 4

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is different from the fourth group of link MAC addresses, and the other link MAC addresses include at least one link MAC address that exists in the fourth group of link MAC addresses, the AP MLD transmits the association response frame to the first STA MLD, wherein the association response frame indicates the successful association.

Case 5

The first group of link MAC addresses include the first link MAC address of the first link and the other link MAC addresses. The first link is the link for transmitting the association request frame, and the other link MAC addresses include the link MAC address other than the first link MAC address in the first group of link MAC addresses.

In the case that the first link MAC address is different from the fourth group of link MAC addresses, and the other link MAC addresses include at least one link MAC address that exists in the fourth group of link MAC addresses, the AP MLD transmits the association response frame to the first STA MLD, wherein the association response frame indicates the failed association.

Case 6

In the case that the fourth group of link MAC addresses include a same link MAC address as any link MAC address in the first group of link MAC addresses, the AP MLD transmits the association response frame to the first STA MLD, wherein the association response frame indicates the failed association.

In some exemplary embodiments, for specific description of the six cases in the embodiments, reference is made to the description of the six cases in the exemplary embodiment shown in FIG. 11, except that the "second group of link MAC addresses" in the six cases in FIG. 11 is replaced with the "fourth group of link MAC addresses". Therefore, details are not described again in the embodiments.

In conclusion, in the method according to the embodiments, in the process that an STA MLD and an AP MLD perform multi-link setup, the AP MLD needs to detect corresponding link MAC addresses of all links requested by the STA MLD to determine whether the detected link MAC addresses are the same as a corresponding link MAC address of at least one STA MLD or STA that has established an association with the AP MLD, or are the same as a corresponding link MAC address of another at least one STA MLD or STA that requests to establish an association.

In some exemplary embodiments, a link MAC address corresponding to a link on which the STA MLD transmits an association request frame is the same as a link MAC address corresponding to another STA MLD or STA that has established an association with the AP MLD, or is the same as a link MAC address corresponding to another STA MLD or STA that requests to establish an association, the AP MLD rejects a multi-link association request of the STA MLD, or the AP MLD conditionally accepts an association request transmitted by the STA MLD on some links.

In the case that link MAC addresses corresponding to other links than the link on which the STA MLD transmits the association request frame are the same as a link MAC address corresponding to another at least one STA MLD or STA that has established the association with the AP MLD, or are the same as the link MAC address corresponding to the another STA MLD or STA that requests to establish the association, the AP MLD rejects the multi-link association request of the STA MLD, or the AP MLD conditionally accepts the association request transmitted by the STA MLD on some links.

In the case that link MAC addresses corresponding to all links of the STA MLD are the same as the link MAC address corresponding to the another at least one STA MLD or STA that has established the association with the AP MLD, or are the same as the link MAC address corresponding to the another STA MLD or STA that requests to establish the association, the AP MLD rejects the multi-link association request of the STA MLD.

During establishment of a multi-link association, whether a link MAC address of a link requested by the STA MLD is the same as a link MAC address of an associated STA and is the same as a link MAC address of another STA that requests to establish an association is checked, and an association response frame is transmitted based on a check result. This prevents an STA that has established an association with the AP MLD from corresponding to a same link MAC address, thereby avoiding a frame interaction failure caused by the same link MAC address.

Apparatus embodiments of the present disclosure are described hereinafter, and the apparatus performs the method embodiments of the present disclosure. For details not disclosed in the apparatus embodiments of the present disclosure, reference is made to the method embodiments of the present disclosure.

Figure 19:
FIG. 19 is a block diagram of an apparatus for establishing a multi-link association according to some exemplary embodiments of the present disclosure.

FIG. 19 is a block diagram of an apparatus for establishing a multi-link association according to some embodiments of the present disclosure. The apparatus is capable of implementing the above method examples. The above method examples may be implemented by hardware or by hardware executing corresponding software. The apparatus may be the AP MLD as described above.

The apparatus includes a first receiver module 1801 configured to receive an association request frame from at least one STA MLD, wherein the association request frame includes a group of link MAC addresses, wherein the group of link MAC addresses include a link MAC address of a link with which the STA MLD requests to establish an association; and a first transmitter module 1802 configured to transmit an association response frame to the at least one STA MLD based on the link MAC address in the association request frame.

In some exemplary embodiments, the at least one STA MLD includes a first STA MLD, and an association request frame transmitted by the first STA MLD includes a first group of link MAC addresses; and the first transmitter module 1802 is configured to transmit the association response frame to the first STA MLD depending on whether the first group of link MAC addresses are the same as a second group of link MAC addresses, wherein the second group of link MAC addresses include a link MAC address of an STA that has established an association with an AP MLD.

In some exemplary embodiments, the first group of link MAC addresses include a first link MAC address of a first link, wherein the first link is a link for transmitting the association request frame; and the first transmitter module 1802 is configured to transmit the association response frame to the first STA MLD in the case that the first link address is the same as a link MAC address in the second group of link MAC addresses, wherein the association response frame indicates a failed association.

In some exemplary embodiments, the first group of link MAC addresses include a first link MAC address of a first link and other link MAC addresses, wherein the first link is a link for transmitting the association request frame, and the other link MAC addresses include a link MAC address other than the first link MAC address in the first group of link MAC addresses; and the first transmitter module 1802 is configured to transmit the association response frame to the first STA MLD in the case that the first link MAC address is the same as a link MAC address in the second group of link MAC addresses and the other link MAC addresses are different from the second group of link MAC addresses, wherein the association response frame indicates a successful association.

In some exemplary embodiments, the first group of link MAC addresses include a first link MAC address of a first link and other link MAC addresses, wherein the first link is a link for transmitting the association request frame, and the other link MAC addresses include a link MAC address other than the first link MAC address in the first group of link MAC addresses; and the first transmitter module 1802 is configured to transmit the association response frame to the first STA MLD in the case that the first link MAC address is the same as a link MAC address in the second group of link MAC addresses and the other link MAC addresses include at least one link MAC address different from the second group of link MAC addresses, wherein the association response frame indicates a successful association.

In some exemplary embodiments, the first group of link MAC addresses include a first link MAC address of a first link and other link MAC addresses, wherein the first link is a link for transmitting the association request frame, and the other link MAC addresses include a link MAC address other than the first link MAC address in the first group of link MAC addresses; and the first transmitter module 1802 is configured to transmit the association response frame to the first STA MLD in the case that the first link MAC address is different from the second group of link MAC addresses and the other link MAC addresses include at least one link MAC address that exists in the second group of link MAC addresses, wherein the association response frame indicates a successful association.

In some exemplary embodiments, the first group of link MAC addresses include a first link MAC address of a first link and other link MAC addresses, wherein the first link is a link for transmitting the association request frame, and the other link MAC addresses include a link MAC address other than the first link MAC address in the first group of link MAC addresses; and the first transmitter module 1802 is configured to transmit the association response frame to the first STA MLD in the case that the first link MAC address is different from the second group of link MAC addresses and the other link MAC addresses include at least one link MAC address that exists in the second group of link MAC addresses, wherein the association response frame indicates a failed association.

In some exemplary embodiments, the first transmitter module 1802 is configured to transmit the association response frame to the first STA MLD in the case that the second group of link MAC addresses include a same link MAC address as any link MAC address in the first group of link MAC addresses, wherein the association response frame indicates a failed association.

In some exemplary embodiments, the at least one STA MLD includes a first STA MLD and other STA MLDs, wherein an association request frame transmitted by the first STA MLD includes a first group of link MAC addresses, and at least one association request frame transmitted by the other STA MLDs includes a third group of link MAC addresses; and the first transmitter module 1802 is configured to transmit the association response frame to the first STA MLD depending on whether the first group of link MAC addresses are the same as a fourth group of link MAC addresses.

The fourth group of link MAC addresses include a second group of link MAC addresses and the third group of link MAC addresses, wherein the second group of link MAC addresses include a link MAC address of an STA that has established an association with the AP MLD.

In some exemplary embodiments, the first group of link MAC addresses include a first link MAC address of a first link, wherein the first link is a link on which the first STA MLD transmits the association request frame; and the first transmitter module 1802 is configured to transmit the association response frame to the first STA MLD in the case that the first link MAC address is the same as a link MAC address in the fourth group of link MAC addresses, wherein the association response frame indicates a failed association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the first transmitter module 1802 is configured to transmit the association response frame to the first STA MLD in the case that the first link MAC address is the same as a link MAC address in the fourth group of link MAC addresses and the other link MAC addresses are different from the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the first transmitter module 1802 is configured to transmit the association response frame to the first STA MLD in the case that the first link MAC address is the same as a link MAC address in the fourth group of link MAC addresses and the other link MAC addresses include at least one link MAC address different from the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the first transmitter module 1802 is configured to transmit the association response frame to the first STA MLD in the case that the first link MAC address is different from the fourth group of link MAC addresses and the other link MAC addresses include at least one link MAC address that exists in the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the first transmitter module 1802 is configured to transmit the association response frame to the first STA MLD in the case that the first link MAC address is different from the fourth group of link MAC addresses, and the other link MAC addresses include at least one link MAC address that exists in the fourth group of link MAC addresses, wherein the association response frame indicates a failed association.

In some exemplary embodiments, the first transmitter module 1802 is configured to transmit the association response frame to the first STA MLD in the case that the fourth group of link MAC addresses include a same link MAC address as any link MAC address in the first group of link MAC addresses, wherein the association response frame indicates a failed association.

In some exemplary embodiments, the association response frame includes a device level status code; or the association response frame includes a device level status code and a link level status code, wherein the device level status code indicates a failed device association, and the link level status code indicates a link association result.

In some exemplary embodiments, the device level status code indicates a link MAC address conflict.

In some exemplary embodiments, for a link that fails to be associated, the link level status code indicates a link MAC address conflict.

In some exemplary embodiments, the association response frame includes a device level status code and a link level status code. The device level status code indicates a successful device association, and the link level status code indicates a link association result.

In some exemplary embodiments the association request frame further includes an STA MLD MAC address of the STA MLD; and the first transmitter module 1802 is configured to perform the step of transmitting the association response frame to the at least one STA MLD based on the link MAC address in the association request frame in the case that in an associated device MAC address, there is no device MAC address the same as the STA MLD MAC address, wherein the associated device MAC address includes a device MAC address of the STA that has established the association with the AP MLD.

Figure 20:
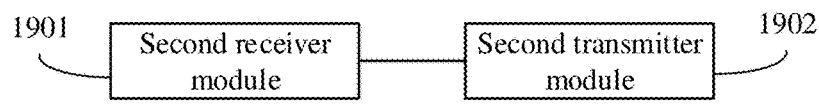
FIG. 20 is a block diagram of an apparatus for establishing a multi-link association according to some exemplary embodiments of the present disclosure.

FIG. 20 is a block diagram of an apparatus for establishing a multi-link association according to some embodiments of the present disclosure. The apparatus is capable of implementing the above method examples. The above method examples may be implemented by hardware or by hardware executing corresponding software. The apparatus may be the first STA MLD described above.

The apparatus includes: a second transmitter module 1902 configured to transmit an association request frame to an AP MLD, wherein the association request frame includes a first group of link MAC addresses, wherein the first group of link MAC addresses include a link MAC address of a link with which the first STA MLD requests to establish an association; and a second receiver module 1901 configured to receive an association response frame from the AP MLD, wherein the association response frame is transmitted based on the first group of link MAC addresses.

In some exemplary embodiments, the association response frame is transmitted depending on whether the first group of link MAC addresses are the same as a second group of link MAC addresses, and the second group of link MAC addresses include a link MAC address of an STA that has established an association with the AP MLD.

In some exemplary embodiments, the first group of link MAC addresses include a first link MAC address of a first link, wherein the first link is a link on which the first STA MLD transmits the association request frame; and the association response frame is transmitted in the case that the first link MAC address is the same as a link MAC address in the second group of link MAC addresses, wherein the association response frame indicates a failed association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is the same as a link MAC address in the second group of link MAC addresses and the other link MAC addresses are different from the second group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is the same as a link MAC address in the second group of link MAC addresses and the other link MAC addresses include at least one link MAC address different from the second group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is different from the second group of link MAC addresses and the other link MAC addresses include at least one link MAC address that exists in the second group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is different from the second group of link MAC addresses and the other link MAC addresses include at least one link MAC address that exists in the second group of link MAC addresses, wherein the association response frame indicates a failed association.

In some exemplary embodiments, the association response frame is transmitted in the case that the second group of link MAC addresses include a same link MAC address as any link MAC address in the first group of link MAC addresses, wherein the association response frame indicates a failed association.

In some exemplary embodiments, the association response frame is transmitted depending on whether the first group of link MAC addresses are the same as a fourth group of link MAC addresses, wherein the fourth group of link MAC addresses include a second group of link MAC addresses and a third group of link MAC addresses, wherein the second group of link MAC addresses include a link MAC address of an STA that has established an association with the AP MLD, and the third group of link MAC addresses include link MAC addresses in association request frames received by the AP MLD from other STA MLDs.

In some exemplary embodiments, the first group of link MAC addresses include a first link MAC address of a first link, wherein the first link is a link on which the first STA MLD transmits the association request frame; and the association response frame is transmitted in the case that the first link MAC address is the same as a link MAC address in the fourth group of link MAC addresses, wherein the association response frame indicates a failed association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is the same as a link MAC address in the fourth group of link MAC addresses and the other link MAC addresses are different from the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is the same as a link MAC address in the fourth group of link MAC addresses and the other link MAC addresses include at least one link MAC address different from the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is different from the fourth group of link MAC addresses and the other link MAC addresses include at least one link MAC address that exists in the fourth group of link MAC addresses, wherein the association response frame indicates a successful association.

In some exemplary embodiments, the first group of link MAC addresses include a first link MAC address of a first link and other link MAC addresses, wherein the first link is a link on which the first STA MLD transmits the association request frame, and the other link MAC addresses include a link MAC address other than the first link MAC address in the first group of link MAC addresses; and the association response frame is transmitted in the case that the first link MAC address is different from the fourth group of link MAC addresses and the other link MAC addresses include at least one link MAC address that exists in the fourth group of link MAC addresses, wherein the association response frame indicates a failed association.

In some exemplary embodiments, the association response frame is transmitted in the case that the fourth group of link MAC addresses include a same link MAC address as any link MAC address in the first group of link MAC addresses, wherein association response frame indicates a failed association.

In some exemplary embodiments, the association response frame includes a device level status code; or the association response frame includes a device level status code and a link level status code, wherein the device level status code indicates a failed device association, and the link level status code indicates a link association result.

In some exemplary embodiments, the device level status code indicates a link MAC address conflict.

In some exemplary embodiments, for a link that fails to be associated, the link level status code indicates a link MAC address conflict.

In some exemplary embodiments, the association response frame includes a device level status code and a link level status code. The device level status code indicates a successful device association, and the link level status code indicates a link association result.

In some exemplary embodiments, the association request frame further includes an STA MLD MAC address of the STA MLD; and the association response frame is transmitted based on the first group of link MAC addresses in the case that in an associated device MAC address, there is no device MAC address the same as the STA MLD MAC address, wherein the associated device MAC address includes a device MAC address of the STA that has established the association with the AP MLD.

It should be noted that when the apparatus according to the above embodiments implements its functions, division of the functional modules is merely used as an example. In an actual application, the functions may be allocated to and completed by different functional modules as required, that is, an internal structure of the apparatus is divided into different functional modules to complete all or some of the foregoing functions.

Specific manners of performing operations by the modules in the apparatus in the foregoing embodiments have been described in detail in the embodiments of the related method, and details are not described herein again.

Figure 21:
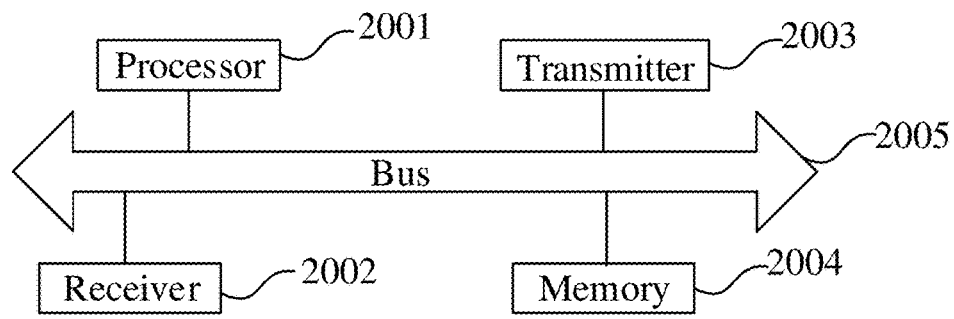
FIG. 21 is a schematic structural diagram of an MLD according to some exemplary embodiments of the present disclosure.

FIG. 21 is a schematic structural diagram of an MLD according to some exemplary embodiments of the present disclosure. The MLD may include a processor 2001, a receiver 2002, a transmitter 2003, a memory 2004, and a bus 2005.

The processor 2001 includes at least one processing core. By running software programs and modules, the processor 2001 runs various function applications and perform a method for establishing a multi-link association.

The receiver 2002 and the transmitter 2003 may be practiced as a transceiver 2006, which may be a communication chip.

The memory 2004 is connected to the processor 2001 over the bus 2005.

The memory 2004 is configured to store a computer program, and the processor 2001 is configured to execute the computer program to perform each step performed by the AP MLD or the STA MLD in the above method embodiments.

In addition, the memory 2004 may be implemented by any type of volatile or non-volatile storage device or a combination thereof. The volatile or non-volatile storage device includes but is not limited to: a random-access memory (RAM), a read-only memory (ROM), an erasable programmable read-only memory (EPROM), an electrically erasable programmable read-only memory (EEPROM), a flash memory or another solid-state storage technology, a compact disc read-only memory (CD-ROM), a high-density digital video disc (DVD) or another optical memory, a magnetic tape cartridge, a magnetic tape, a disk memory, or another magnetic memory device.

The processor and the transceiver involved in the embodiments of the present disclosure are capable of performing the steps performed by the MLD in the method shown in any one of FIG. 9, FIG. 10, and FIG. 11. Details are not described herein again.

Some embodiments of the present disclosure further provide a non-transitory computer-readable storage medium. The computer-readable storage medium stores a computer program, and the computer program, when loaded and run by a processor of an MLD, causes the MLD to perform the method for establishing a multi-link association.

In some exemplary embodiments, the computer-readable storage medium may include a ROM, a RAM, a solid-state drive (SSD), an optical disk, or the like. The RAM may include a resistance random access memory (ReRAM) and a dynamic random access memory (DRAM).

Some embodiments of the present disclosure further provide a chip. The chip includes a programmable logic circuit and/or program instructions. The chip is run on an MLD to perform the foregoing method for establishing a multi-link association.

Some embodiments of the present disclosure further provide a computer program product or a computer program. The computer program product or the computer program includes computer instructions. The computer instructions are stored in a computer-readable storage medium, and when read from the computer-readable storage medium and executed by a processor of an MLD, cause the MLD to perform implement the method for establishing a multi-link association.

The processor in the embodiments of the present disclosure includes an application specific integrated circuit (ASIC).

It should be understood that the "indication" mentioned in the embodiments of the present disclosure may be a direct indication, an indirect indication, or an association relationship. For example, A indicates B, which may mean that A directly indicates B, for example, B may be derived from A; may mean that A indirectly indicates B, for example, A indicates C, and B may be derived from C; or may mean an association relationship between A and B.

In the description of the embodiments of the present disclosure, the term "corresponding" indicates a direct or indirect correspondence between two objects, an association relationship between the two objects, or a relationship between indication and being indicated, between configuration and being configured, or the like.

The term "a plurality of" in this specification means two or more. The term "and/or" describes associations between associated objects, and it indicates three types of relationships. For example, "A and/or B" may indicate that A exists alone, A and B coexist, or B exists alone. The symbol "/" usually indicates an "or" relationship between associated objects.

In addition, the step number in this specification only exemplifies one possible step execution order. In some other embodiments, the above steps may also be executed without following a numbering order. For example, two steps with different numbers are executed simultaneously or in an order revere to the order shown in the figures. This is not limited in the embodiments of the present disclosure.

A person skilled in the art should be aware that in the foregoing one or more examples, the functions described in the embodiments of the present disclosure may be implemented by hardware, software, firmware, or any combination thereof. When implemented by software, the functions may be stored in a computer-readable medium or transmitted as at least one instruction or code on the computer-readable medium. The computer-readable medium includes a computer storage medium and a communication medium. The communication medium includes any medium that facilitates transfer of a computer program from one place to another. The storage medium may be any usable medium accessible by a general-purpose computer or a special-purpose computer.

Described above are merely exemplary embodiments of the present disclosure and are not intended to limit the present disclosure. Any modification, equivalent replacement, and improvement within the spirit and principle of the present disclosure shall be included within the protection scope of the present disclosure.

The invention claimed is:

1. A method for establishing a multi-link association, applicable to an access point (AP) multi-link device (MLD), the method comprising:
receiving an association request frame from at least one station (STA) MLD, wherein the at least one STA MLD comprises a first STA MLD, wherein an association request frame transmitted by the first STA MLD comprises a first group of link medium access control (MAC) addresses, the first group of link MAC addresses comprising a link MAC address of a link with which the STA MLD requests to establish an association, the link MAC address of the link is a STA wireless medium (WM) address of a STA connected with the link; and
transmitting an association response frame to the first STA MLD depending on whether the first group of link MAC addresses are the same as a second group of link MAC addresses, wherein the second group of link MAC addresses comprise a link MAC address of an STA that has established an association with the AP MLD, wherein the link MAC address of the STA is a STA WM address of the STA.

2. The method according to claim 1, wherein transmitting the association response frame to the first STA MLD depending on whether the first group of link MAC addresses are the same as the second group of link MAC addresses comprises one of:
in a case that the first group of link MAC addresses comprise a first link MAC address of a first link, transmitting the association response frame to the first STA MLD in a case that the first link MAC address is the same as a link MAC address in the second group of link MAC addresses, wherein the association response frame indicates a failed association, and the first link is a link on which the first STA MLD transmits the association request frame;
in a case that the first group of link MAC addresses comprise a first link MAC address of a first link and other link MAC addresses, transmitting the association response frame to the first STA MLD in a case that the first link MAC address is different from the second group of link MAC addresses and the other link MAC addresses comprise at least one link MAC address that exists in the second group of link MAC addresses, wherein the association response frame indicates a failed association, the first link is a link on which the first STA MLD transmits the association request frame, and the other link MAC addresses comprise a link MAC address other than the first link MAC address in the first group of link MAC addresses; or
transmitting the association response frame to the first STA MLD in a case that the second group of link MAC addresses comprise a same link MAC address as any link MAC address in the first group of link MAC addresses, wherein the association response frame indicates a failed association.

3. The method according to claim 2, wherein
the association response frame comprises a device level status code; or
the association response frame comprises a device level status code and a link level status code,
wherein the device level status code indicates a failed device association, and the link level status code indicates a link association result.

4. The method according to claim 3, wherein there is at least one of:
the device level status code indicates a link MAC address conflict; or
for a link that fails to be associated, the link level status code indicates a link MAC address conflict.

5. The method according to claim 1, wherein transmitting the association response frame to the first STA MLD depending on whether the first group of link MAC addresses are the same as the second group of link MAC addresses comprises one of:
in a case that the first group of link MAC addresses comprise a first link MAC address of a first link and other link MAC addresses, transmitting the association response frame to the first STA MLD in a case that the first link MAC address is the same as a link MAC address in the second group of link MAC addresses and the other link MAC addresses are different from the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses;
in a case that the first group of link MAC addresses comprise a first link MAC address of a first link and other link MAC addresses, transmitting the association response frame to the first STA MLD in a case that the first link MAC address is the same as a link MAC address in the second group of link MAC addresses and the other link MAC addresses comprise at least one link MAC address different from the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses; or
in a case that the first group of link MAC addresses comprise a first link MAC address of a first link and other link MAC addresses, transmitting the association response frame to the first STA MLD in a case that the first link MAC address is different from the second group of link MAC addresses and the other link MAC addresses comprise at least one link MAC address that exists in the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses.

6. The method according to claim 5, wherein the association response frame comprises a device level status code and a link level status code, wherein the device level status code indicates a successful device association, and the link level status code indicates a link association result.

7. The method according to claim 1, wherein
the at least one STA MLD further comprises other STA MLDs, wherein at least one association request frame transmitted by the other STA MLDs comprises a third group of link MAC addresses; and the method further comprises:
transmitting the association response frame to the first STA MLD depending on whether the first group of link MAC addresses are the same as a fourth group of link MAC addresses,
wherein the fourth group of link MAC addresses comprise a second group of link MAC addresses and the third group of link MAC addresses, and the second group of link MAC addresses comprise a link MAC address of an STA that has established an association with the AP MLD.

8. The method according to claim 7, wherein transmitting the association response frame to the first STA MLD depending on whether the first group of link MAC addresses are the same as the fourth group of link MAC addresses comprises one of:
in a case that the first group of link MAC addresses comprise a first link MAC address of a first link, transmitting the association response frame to the first STA MLD in a case that the first link MAC address is the same as a link MAC address in the fourth group of link MAC addresses, wherein the association response frame indicates a failed association, wherein the first link is a link on which the first STA MLD transmits the association request frame;
in a case that the first group of link MAC addresses comprise a first link MAC address of a first link and other link MAC addresses, transmitting the association response frame to the first STA MLD in a case that the first link MAC address is different from the fourth group of link MAC addresses and the other link MAC addresses comprise at least one link MAC address that exists in the fourth group of link MAC addresses, wherein the association response frame indicates a failed association, the first link is a link on which the first STA MLD transmits the association request frame, and the other link MAC addresses comprise a link MAC address other than the first link MAC address in the first group of link MAC addresses; or
transmitting the association response frame to the first STA MLD in a case that the fourth group of link MAC addresses comprise a same link MAC address as any link MAC address in the first group of link MAC addresses, wherein the association response frame indicates a failed association.

9. The method according to claim 7, wherein transmitting the association response frame to the first STA MLD depending on whether the first group of link MAC addresses are the same as the fourth group of link MAC addresses comprises one of:
in a case that the first group of link MAC addresses comprise a first link MAC address of a first link and other link MAC addresses, transmitting the association response frame to the first STA MLD in a case that the first link MAC address is the same as a link MAC address in the fourth group of link MAC addresses and the other link MAC addresses are different from the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses;
in a case that the first group of link MAC addresses comprise a first link MAC address of a first link and other link MAC addresses, transmitting the association response frame to the first STA MLD in a case that the first link MAC address is the same as a link MAC address in the fourth group of link MAC addresses and the other link MAC addresses comprise at least one link MAC address different from the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses; or
in a case that the first group of link MAC addresses comprise a first link MAC address of a first link and other link MAC addresses, transmitting the association response frame to the first STA MLD in a case that the first link MAC address is different from the fourth group of link MAC addresses and the other link MAC addresses comprise at least one link MAC address that exists in the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses.

10. The method according to claim 1, wherein the association request frame further comprises an STA MLD MAC address of the STA MLD, and the method further comprises:
performing the step of transmitting the association response frame to the at least one STA MLD based on the link MAC address in the association request frame in a case that in an associated device MAC address, there is no device MAC address the same as the STA MLD MAC address,
wherein the associated device MAC address comprises a device MAC address of the STA that has established the association with the AP MLD.

11. A multi-link device (MLD), comprising a processor and a transceiver connected to the processor; wherein
the transceiver is configured to receive an association request frame from at least one station (STA) MLD, wherein the at least one STA MLD comprises a first STA MLD, wherein an association request frame transmitted by the first STA MLD comprises a first group of link medium access control (MAC) addresses, wherein the first group of link MAC addresses comprise a link MAC address of a link with which the STA MLD requests to establish an association, the link MAC address of the link is a STA wireless medium (WM) address of a STA connected with the link; and
the transceiver is configured to transmit an association response frame to the first STA MLD depending on whether the first group of link MAC addresses are the same as a second group of link MAC addresses, wherein the second group of link MAC addresses comprise a link MAC address of an STA that has established an association with the AP MLD, wherein the link MAC address of the STA is a STA WM address of the STA.

12. The MLD according to claim 11, wherein the transceiver is configured to perform one of:

in a case that the first group of link MAC addresses comprise a first link MAC address of a first link, transmitting the association response frame to the first STA MLD in a case that the first link MAC address is the same as a link MAC address in the second group of link MAC addresses, wherein the association response frame indicates a failed association, and the first link is a link on which the first STA MLD transmits the association request frame;

in a case that the first group of link MAC addresses comprise a first link MAC address of a first link and other link MAC addresses, transmitting the association response frame to the first STA MLD in a case that the first link MAC address is different from the second group of link MAC addresses and the other link MAC addresses comprise at least one link MAC address that exists in the second group of link MAC addresses, wherein the association response frame indicates a failed association, the first link is a link on which the first STA MLD transmits the association request frame, and the other link MAC addresses comprise a link MAC address other than the first link MAC address in the first group of link MAC addresses; or transmitting the association response frame to the first STA MLD in a case that the second group of link MAC addresses comprise a same link MAC address as any link MAC address in the first group of link MAC addresses, wherein the association response frame indicates a failed association.

13. The MLD according to claim 11, wherein the transceiver is configured to perform one of:

in a case that the first group of link MAC addresses comprise a first link MAC address of a first link and other link MAC addresses, transmitting the association response frame to the first STA MLD in a case that the first link MAC address is the same as a link MAC address in the second group of link MAC addresses and the other link MAC addresses are different from the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses;

in a case that the first group of link MAC addresses comprise a first link MAC address of a first link and other link MAC addresses, transmitting the association response frame to the first STA MLD in a case that the first link MAC address is the same as a link MAC address in the second group of link MAC addresses and the other link MAC addresses comprise at least one link MAC address different from the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses; or in a case that the first group of link MAC addresses comprise a first link MAC address of a first link and other link MAC addresses, transmitting the association response frame to the first STA MLD in a case that the first link MAC address is different from the second group of link MAC addresses and the other link MAC addresses comprise at least one link MAC address that exists in the second group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses.

14. The MLD according to claim 11, wherein the at least one STA MLD further comprises other STA MLDs, wherein at least one association request frame transmitted by the other STA MLDs comprises a third group of link MAC addresses; and the transceiver is configured to further perform:

transmitting the association response frame to the first STA MLD depending on whether the first group of link MAC addresses are the same as a fourth group of link MAC addresses, wherein the fourth group of link MAC addresses comprise a second group of link MAC addresses and the third group of link MAC addresses, and the second group of link MAC addresses comprise a link MAC address of an STA that has established an association with the AP MLD.

15. The MLD according to claim 14, wherein the transceiver is configured to perform one of:

in a case that the first group of link MAC addresses comprise a first link MAC address of a first link, transmitting the association response frame to the first STA MLD in a case that the first link MAC address is the same as a link MAC address in the fourth group of link MAC addresses, wherein the association response frame indicates a failed association, wherein the first link is a link on which the first STA MLD transmits the association request frame;

in a case that the first group of link MAC addresses comprise a first link MAC address of a first link and other link MAC addresses, transmitting the association response frame to the first STA MLD in a case that the first link MAC address is different from the fourth group of link MAC addresses and the other link MAC addresses comprise at least one link MAC address that exists in the fourth group of link MAC addresses, wherein the association response frame indicates a failed association, the first link is a link on which the first STA MLD transmits the association request frame, and the other link MAC addresses comprise a link MAC address other than the first link MAC address in the first group of link MAC addresses; or transmitting the association response frame to the first STA MLD in a case that the fourth group of link MAC addresses comprise a same link MAC address as any link MAC address in the first group of link MAC addresses, wherein the association response frame indicates a failed association.

16. The MLD according to claim 14, wherein the transceiver is configured to perform one of:
- in a case that the first group of link MAC addresses comprise a first link MAC address of a first link and other link MAC addresses, transmitting the association response frame to the first STA MLD in a case that the first link MAC address is the same as a link MAC address in the fourth group of link MAC addresses and the other link MAC addresses are different from the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses;
- in a case that the first group of link MAC addresses comprise a first link MAC address of a first link and other link MAC addresses, transmitting the association response frame to the first STA MLD in a case that the first link MAC address is the same as a link MAC address in the fourth group of link MAC addresses and the other link MAC addresses comprise at least one link MAC address different from the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses; or
- in a case that the first group of link MAC addresses comprise a first link MAC address of a first link and other link MAC addresses, transmitting the association response frame to the first STA MLD in a case that the first link MAC address is different from the fourth group of link MAC addresses and the other link MAC addresses comprise at least one link MAC address that exists in the fourth group of link MAC addresses, wherein the association response frame indicates a successful association, the first link is a link on which the first STA MLD transmits the association request frame, and the other link MAC addresses comprise a link MAC address other than the first link MAC address in the first group of link MAC addresses.

17. The MLD according to claim 11, wherein the association request frame further comprises an STA MLD MAC address of the STA MLD, and the transceiver is further configured to perform:
- performing the step of transmitting the association response frame to the at least one STA MLD based on the link MAC address in the association request frame in a case that in an associated device MAC address, there is no device MAC address the same as the STA MLD MAC address,
- wherein the associated device MAC address comprises a device MAC address of the STA that has established the association with the AP MLD.

18. A multi-link device (MLD), comprising a processor and a transceiver connected to the processor; wherein
- the transceiver is configured to transmit an association request frame to an access point (AP) MLD, wherein the association request frame comprises a first group of link medium access control (MAC) addresses, wherein the first group of link MAC addresses comprise a link MAC address of a link with which a first station (STA) MLD requests to establish an association, the link MAC address of the link is a STA wireless medium (WM) address of a STA connected with the link; and
- the transceiver is configured to receive an association response frame from the AP MLD, wherein the association response frame is transmitted by the AP MLD depending on whether the first group of link MAC addresses are the same as a second group of link MAC addresses, wherein the second group of link MAC addresses comprise a link MAC address of an STA that has established an association with the AP MLD, wherein the link MAC address of the STA is a STA WM address of the STA.

* * * * *